United States Patent [19]
Kasahara et al.

[11] Patent Number: 5,920,403
[45] Date of Patent: Jul. 6, 1999

[54] CONTROL METHOD AND CONTROL SYSTEM FOR A COPIER

[75] Inventors: Seitaro Kasahara; Kazuhisa Maruyama; Motoki Nakamichi; Tomoo Kudo; Tetsuhiro Kodera, all of Hachioji, Japan

[73] Assignee: Konica Corporation, Tokyo, Japan

[21] Appl. No.: 08/725,625

[22] Filed: Oct. 3, 1996

[30] Foreign Application Priority Data

Oct. 9, 1995 [JP] Japan ................................. 7-261420
Nov. 17, 1995 [JP] Japan ................................. 7-300176

[51] Int. Cl.⁶ ................................................. H04N 1/00
[52] U.S. Cl. ........................... 358/434; 358/405; 358/435
[58] Field of Search .................................. 358/403, 405, 358/400, 404, 434, 407, 435, 438, 440, 468, 443

[56] References Cited

U.S. PATENT DOCUMENTS 3,638,198  1/1972  Balogh, Jr. ............................. 340/172.5
5,627,661  5/1997  Negishi et al. .......................... 358/470

Primary Examiner—Thomas D. Lee
Assistant Examiner—Jerome Grant, II
Attorney, Agent, or Firm—Frishauf, Holtz, Goodman, Langer & Chick

[57] ABSTRACT

A system for controlling data transmission comprises at least two control devices, a first common communication line to which each of the at least two control devices is connected, and a plurality of operation devices for carrying out respective processing operations. Each of the at least two control devices is connected with a different one of the plurality of operation devices and is provided with a priority rank depending on the one of the operation devices connected thereto. And each of the at least two control devices comprises: (i) a memory for storing at least one of command data and status data corresponding to the one of the operation devices connected thereto, (ii) a priority rank discriminator for discriminating whether a right to transmit data is requested by another one of the control devices having a higher priority rank, and (iii) a transmitter for transmitting the data stored in the memory to the first common communication line only if the priority rank discriminator discriminates that the right to transmit data has not been requested by another one of the control devices having the higher priority rank.

18 Claims, 24 Drawing Sheets

| NAME OF SIGNAL | CONTENT | REMARKS |
|---|---|---|
| DATA - 1 | DATA, COMMAND, ID | 1st LINE, TWO-WAY |
| SUSY & LATCH - 1 | IN-COMMUNICATION JUDGMENT, DATA LATCH | 1st LINE, TWO-WAY |
| DATA - 2 | DATA, COMMAND, ID | 2nd LINE, TWO-WAY |
| SUSY & LATCH - 2 | IN-COMMUNICATION JUDGMENT, DATA LATCH | 2nd LINE, TWO-WAY |
| X & CLOCK | ORIGINAL OSCILLATION, SYNCHRONOUS CLOCK | COMMON LINE |

| PRIORITY | BLOCK | REMARKS |
|---|---|---|
| 1 | CONTROL BLOCK | |
| 2 | OPTICAL BLOCK | |
| 3 | ADF BLOCK | |
| 4 | DRUM BLOCK | |
| 5 | SHEET FEED BLOCK | |
| 6 | PFU / LCT BLOCK | |
| 7 | ADU BLOCK | |
| 8 | AC BLOCK | |
| 9 | STR BLOCK | |

| HIGH ORDER 4 BITS | COMMAND FUNCTION |
|---|---|
| 0 | COMMUNICATION FUNCTION |
| 1 | I / O FUNCTION |
| 2 | TIMER 1 FUNCTION |
| 3 | TIMER 2 FUNCTION |
| 4 | D / A SERIAL OUTPUT FUNCTION |
| 5 | CEL SERIAL OUTPUT FUNCTION |
| 6 | A / D CONVERSION FUNCTION |
| 7 | STEP MOTOR FUNCTION |
| 8 | RAM TRANSFER FUNCTION |
| 9~F | UNDEFINED |

| LOWER ORDER 4 BITS | COMMAND FUMCTION |
|---|---|
| 0~F | UNDEFINED |

| HIGH ORDER 4 BITS | ID FUNCTION |
|---|---|
| 0 | UNDEFINED |
| 1~9 | TRANSMITTER ID NUMBER |
| A~F | UNDEFINED |

| LOWER ORDER 4 BITS | ID FUNCTION |
|---|---|
| 0 | FOR THE ENTIRE BLOCKS |
| 1~9 | RECEIVER ID NUMBER |
| A~F | UNDEFINED |

FIG. 12

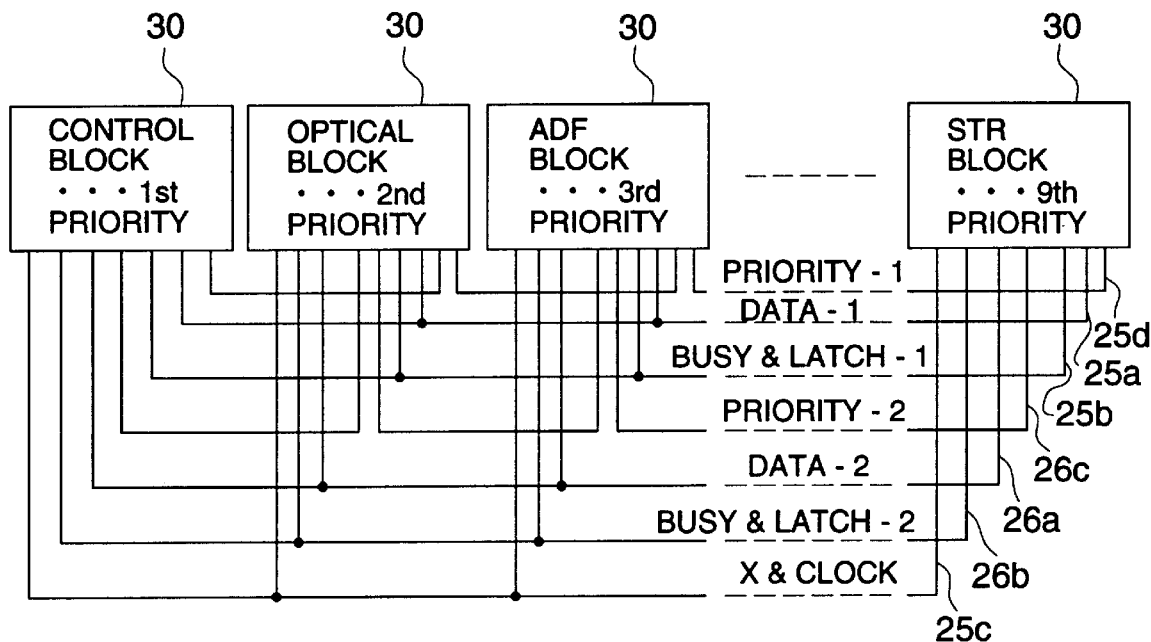

FIG. 13

| NAME OF SIGNAL | CONTENT | REMARKS |
|---|---|---|
| PRIORITY - 1 | PRIORITY JUDGMENT FOR ACQUIRING THE TRANSMMISSION RIGHT | 1st LINE |
| DATA - 1 | DATA, COMMAND, ID | 1st LINE |
| SUSY & LATCH - 1 | IN-COMMUNICATION JUDGMENT, DATA LATCH | 1st LINE |
| PRIORITY - 2 | PRIORITY JUDGMENT FOR ACQUIRING THE TRANSMMISSION RIGHT | 2nd LINE |
| DATA - 2 | DATA, COMMAND, ID | 2nd LINE |
| SUSY & LATCH - 2 | IN-COMMUNICATION JUDGMENT, DATA LATCH | 2nd LINE |
| X & CLOCK | ORIGINAL OSCILLATION, SYNCHRONOUS CLOCK | COMMON LINE |

CONTROL METHOD AND CONTROL SYSTEM FOR A COPIER

BACKGROUND OF THE INVENTION

The present invention relates to a control method and a control system, and more specifically, to a control method and a control system appropriate for a copier, or similar apparatus.

Recent enhancement in the functions of office automation apparatuses (OA apparatuses) has been conspicuous due to the progress of computer technology. However, in proportion to the enhanced functions, the control of these apparatuses has become more complicated and highly advanced, and thereby, an increase in speed and capacity of CPUs for controlling OA apparatuses, an increase in scale of software, and a subsequent increase in the number and complexity of signal lines in the apparatuses, have become unavoidable. In FIG. 17, an example of a control of a copier by a conventional CPU is shown. In FIG. 17, it can be seen that the CPU1 provided on a control board, a plurality of various loads, and sensors are connected by parallel signal lines, and functional sections of the copier are all collectively controlled. There is a possibility that an increase of the number of signal lines and their complexity due to the centralization control results in a decrease of reliability due to induction noise from other signal lines, or imperfect contact of connectors.

Some conventional copiers operate according to a method in which controlled systems are separated into several operation blocks, and the control is distributed into these blocks by providing a CPU in each operation block. FIG. 18 is a block diagram of the distributed system of such a conventional copier. In this example, a main CPU 2, provided on one control board, and sub CPUs 3, respectively provided in each function section, are connected by exclusive-use serial communication lines 4, and each sub CPU 3 and each load, and each sensor are connected by parallel signal lines. Due to this structure, an increase in the number of signal lines and the complexity of the signal lines in the apparatus are suppressed to some degree. However, when the number of sub CPUs 3 is increased, the number of exclusive-use serial communication lines 4 is subsequently increased. Further, in a conventional serial communication function, internal interruption occurs during transmission and reception of signals, and a processing operation, currently being conducted, is interrupted once so that interrupt processing can be carried out at every occurrence of an interruption. Thereby, when the number of serial communication lines 4 is increased, the interrupted period of time of the main CPU 2 is increased, and therefore the influence on the processing which is currently being conducted, becomes not negligible.

Also known is a LAN (Local Area Network) system in which communication lines are commonly used by a plurality of CPUs. FIG. 19 is a block diagram showing an example of a distributed system of a copier used in conventional LAN systems. The same blocks as in FIG. 18 are shown by the same numerals. The main CPU 2 and each sub CPU 3 are connected by a common serial communication line 5. In this example, the communication line is commonly used by each block, and thereby, when the number of sub CPUs is increased, an increase in the number of communication lines is suppressed. However, when the number of sub CPUs 3 is increased, the degree of interference of the communication lines 5 is correspondingly increased. Accordingly, even when urgent communication is required, the number of chances, in which communication can not be carried out because another sub CPU 3 is using the communication line 5, is increased, and thereby, the influence on urgent processing becomes not negligible.

FIG. 20 is a view showing an example of a conventional LAN system (Japanese Patent Publication Open to Public Inspection No. 69947/1981). In FIG. 20, (a) is a block diagram showing the structure of a conventional LAN system, and (b) is the time chart of (a). In FIG. 20 (a), symbols A, B, C are operation blocks, DATA is a data bus, IRQ is a signal line for data transfer request, and DAR is a data ready signal line. In FIG. 20, initially, IRQ falls, after which, DAR rises, and then data is outputted. When data has been transferred, IRQ rises, after which, DAR falls, and one sequence is completed. In this example, there is no relationship between the main and sub CPUs in operation blocks A, B and C, they are in the same order, and there is no priority among the operation blocks. FIG. 20 is not structured by considering conditions of the response speed, required as in the control of a copier, such as an optical system control in which a relatively high speed response is required, a process control of a drum and its relating apparatus in which an intermediate speed response is allowable, or a transfer sheet conveyance system control in which a lower speed response is also allowable. As a result, the influence on the urgent processing in the high speed response system is not negligible. Further, in a plurality of operation blocks, IRQs can simultaneously fall, resulting in interference of data.

FIG. 21 is a view showing another example of a conventional LAN system (Japanese Patent Publication Open to Public Inspection No. 7651/1983). This example is composed of a main block 6 and a plurality of sub blocks 7. In this structure, the sub blocks 7 can not transmit data by themselves until they are called by the main block 6. Therefore, even when urgent communication is required by the sub blocks 7, the possibility in which communication can not be carried out, is increased, and adverse influence on the urgent processing is a distinct possibility.

A system shown in FIG. 22 (Japanese Patent Publication Open to Public Inspection No. 114306/1986) is also composed of a main CPU 8 and sub CPUs 9 as shown in FIG. 20, and the main CPU 8 and the sub CPUs 9 are connected with a communication line 10. Also in this system, the sub CPUs 9 can not transmit data by themselves until they are called by the main CPU 8. Therefore, even when urgent communication is required by the sub CPUs 9, the possibility in which communication can not be carried out, is increased, and the influence on the urgent processing becomes not negligible.

The LAN system shown in FIG. 23, is a case in which operation blocks 11 and 13 are connected with respective communication lines 14 and 15, in a closed loop, through a LAN interface section 12 (Japanese Patent Publication Open to Public Inspection No. 114306/1986). In each operation block, a main block and sub blocks are provided. However, this system is structured as a delivery system in which all operation blocks are connected in a loop, and therefore, when it is required to transmit data from one operation block to another operation block, a transmission delay is increased, caused by transmission through the non-relating transmission loop. Further, the operation block can not transmit data by itself before being called by another operation block. Therefore, even when urgent communication is required by each operation block, the possibility in which communication can not be carried out, is increased, and an influence on the urgent processing is not negligible.

The system shown in FIG. 24, is also a case in which operation blocks 16 are connected by a loop communication line 17 in the same manner as in FIG. 23 (Japanese Patent Publication Open to Public Inspection No. 281046/1987). In this case, there is a problem which is the same as in the system in FIG. 23. That is, when it is required to transmit data from one operation block to another operation block, a transmission delay, caused by transmission through the non-relating transmission loop, is increased. Further, the operation block can not transmit data by itself before being called by another operation block. Therefore, even when urgent communication is required by any operation block, the possibility in which communication can not be carried out, is increased, and an influence on the urgent processing is not negligible.

As described above, in the conventional systems, control is not conducted by taking into consideration conditions of the speed of each operation block, and as a result, there is a problem in that quick communication can not be performed, even when urgent communication is required by one of the operation blocks.

SUMMARY OF THE INVENTION

The present invention was achieved in view of the foregoing problems. In a LAN system in which a communication line is commonly used by a plurality of control means, an object of the present invention is to provide a control method and a control system, in which urgent communication can be performed for conditions of response speeds, as in a case of a copier, such as, in an optical system control in which comparatively high speed response is required, a process control of a drum and its relating devices in which an intermediate speed response is allowable, and a transfer sheet conveyance system control in which a lower speed response is allowable; and in which the conditions of response speed are further considered.

The invention to solve the foregoing problems is characterized in that: at least 2 control means to respectively control any of a plurality of operation means, in which the condition of response speed is different from each other, acquire the right to transmit command data to operate any of the operation means, or to transmit status data of the operation means, according to the priority based on the condition of the response speed of each operation means.

According to the structure of the invention, the control means acquire the right to transmit command data to operate any of the operation means, or to transmit status data of the operation means, according to the priority based on the condition of the response speed of each operation means, and thereby, in a LAN system in which a communication line is commonly used by a plurality of control means, the present invention can provide a control method, in which conditions of response speeds are considered, as in a case of the copier, such as, in an optical system control in which comparatively high speed response is required, a process control of a drum and its related devices in which an intermediate speed response is allowable, and a transfer sheet conveyance system control in which a lower speed response is allowable.

The foregoing problems are solved by the invention comprising: a plurality of operation means to carry out specific processing, in which conditions of the response speed are different from each other; at least 2 control means to respectively control any of the operation means; and a connection means to inter-connect the control means, wherein the control means, in which a priority is respectively designated according to the condition of the response speed of the operation means, has a memory means to store the command data for any of the operation means, and the status data of the operation means therein; an in-communication discrimination means to discriminate whether another control means is in serial communication, or not; a priority discrimination means to discriminate whether another control means having a higher priority is requiring the serial communication, or not, when it is discriminated by the in-communication discrimination means that no control means is in serial communication; and a communication means to serially transfer the command data or the status data stored in the memory, when it is discriminated by the priority discrimination means that no other control means having higher priority is requiring the serial communication, and when the control means itself is requiring the serial communication.

Due to this structure, the communication means, provided in the control means, judges whether any control means is serially transferring data, and judges whether another control means, having higher priority than this control means itself, is declaring the communication, according to a previously specified priority, when no control means is serially transferring data; and when no control means is declaring the communication, this control means itself declares the communication and starts the serial transferring; and thereby, the present invention can provide a control system, in which conditions of response speeds are considered, as in a case of a copier, such as, in an optical system control in which comparatively high speed response is required, a process control of a drum and its related devices in which an intermediate speed response is allowable, and a transfer sheet conveyance system control in which a lower speed response is allowable.

In this case, the above system is characterized in that identical priority designation by plural control means is prohibited.

Due to the structure of the invention, requirements for transmission do not occur at the same time, and thereby, quick data transmission can be conducted.

Each control means comprises: a receiver designation means to add receiver designation information to command data or status data, stored in the memory means; and a receiver discrimination means to discriminate, by the receiver designation means, whether received data is for the control means itself, when command data or status data is received from other control means.

Due to this structure of the invention, data can be securely transmitted to the specific data receiver by designating the data receiver by use of the receiver designation means. Further, receipt of transmitted data can be secured by discriminating whether transmitted data is for the control means itself, by using the receiver discriminating means.

Further, the invention to solve the foregoing problems is as follows.

A control method in which at least 2 control means to respectively control any of a plurality of operation means, in which the condition of response speed is different from each other, acquire the right to transmit command data to operate any of the operation means, or to transmit status data of the operation means, according to the priority based on the condition of the response speed of each operation means, the control method characterized in that at least 2 control means acquire the transmission right to use the second connection means according to the priority, when these control means can not acquire the transmission right to use the first connection means.

Due to this structure of the invention, when the transmission right to use the first connection means can not be acquired, the transmission right to use the second connection means can be acquired, and thereby, the present invention can provide the control method by which urgent communication can be performed, and in which the condition of the response speed is further considered.

The above object can be attained by the structure comprising: a plurality of operation means to carry out specific processings, in which conditions of the response speed are different from each other; at least 2 control means to respectively control any of the operation means; and at least 2 connection means to connect the control means to each other, wherein the control means, in which the priority is respectively designated according to the condition of the response speed of the operation means, have a memory means to store the command data for any of the operation means, and the status data of the operation means therein; an in-communication discrimination means to discriminate whether another control means is in serial communication, or not; a priority discrimination means to discriminate whether another control means having higher priority is requiring the serial communication, or not, when it is discriminated by the in-communication discrimination means that no control means is in serial communication; a communication means to transfer in serial the command data or the status data stored in the memory, when it is discriminated by the priority discrimination means that no other control means having higher priority is requiring the serial communication, and when the control means itself is requiring the serial communication; and a switching means to switch between the first and the second connection means.

Due to this structure of the invention, the invention comprises the first and the second connection means; any transmission right acquisition means, provided in the control means, judges whether any control means is serially transferring data, and judges whether another control means, having higher priority than this control means itself, is declaring the communication, according to a previously specified priority, when no control means is serially transferring data; when no control means is declaring the communication, this control means itself declares the communication and starts the serial transferring; when a control means is in serial transfer, the connection means is switched by the switching means, and another transmission right acquisition means discriminates whether the communication can be declared or not; and when the communication declaration is possible, the serial communication is started. Accordingly, in the LAN method in which a communication line is commonly used by a plurality of control means, the present invention can provide a control system, in which urgent communication can be performed for conditions of response speeds, as in a case of a copier, such as, in an optical system control in which comparatively high speed response is required, a process control of a drum and its relating devices in which an intermediate speed response is allowable, and a transfer sheet conveyance system control in which a lower speed response is allowable; and in which the conditions of response speed are further considered.

In this case, the above system is characterized in that the same priority designation by any two control means is prohibited.

Due to the structure of the invention, data interference between any two control means can be prevented.

Further, the above control system is characterized in that the priority designation can be carried out for each connection means.

According to this structure of the invention, by enabling the priority designation for each connection means, when there are plural controls requiring comparatively high speed response, the urgent communication can be performed by allocating the highest priority for each connection means, and thereby, a control system in which the condition of the response speed of each control means is further considered, can be realized.

Further, the above system is characterized in that a switching judgment means to prohibit the switching of the switching means is provided in the system.

According to this structure of the invention, when the switching of the switching means is prohibited in the low speed response system, a control system by which urgent communication in the high speed response system can be carried out, and in which the condition of the response speed of each control means is further considered, can be realized.

Further, the above system is characterized in that the connection means is switched to another connection means while any of the control means is in the serial transfer using the previously switched connection means.

Due to this structure of the invention, when the connection means is switched to another connection means while any of the control means is in serial transfer by the previously switched connection means, a control system, in which an empty connection means is automatically searched for, and thereby, the urgent communication can be conducted, and the condition of the response speed of each control means is further considered, can be realized.

Further, the above system is characterized in that the connection means is returned to the first connection means while some control means is in serial transfer using the switched connection means.

Due to this structure of the invention, when the connection means is returned to the first connection means while some control means is during the serial transfer using the switched second connection means, waiting at the second connection means is prohibited, and the second connection means is ranked for the urgent communication, and thereby, a control system in which the condition of the response speed of each control means is further considered, can be realized.

Further, the above system is characterized in that the connection means is returned to the first connection means when the serial transfer has been completed by the previously switched connection means.

Due to this structure of the invention, when the connection means is returned to the first connection means in the case where the serial transfer has been completed by the previously switched connection means, the connection means, except the first connection means, is ranked for the urgent communication by normally using only the first connection means, and thereby, a control system in which the condition of the response speed of each control means is further considered, can be realized.

Still further, the above system is characterized in that at least 2 or more control systems connected by the first connection means are not the same as the control systems connected by the second connection means.

Due to this structure of the invention, when at least 2 or more control systems connected by the first connection means are not the same as the control systems connected by another connection means, the connection means, except the first connection means, are allocated for only control means, requiring comparatively high speed response, or allocated also for control means in which intermediate speed response is allowable, so that the urgent communication can be carried out, and thereby, a control system in which the condition of the response speed of each control means is further considered, can be realized.

BRIEF DESCRIPTION OF THE DRAWINGS

FIG. 12 is a view showing an example of the structure of connections of Example 2.

FIG. 13 is a view explaining the communication line used for Example 2.

DETAILED DESCRIPTION OF THE PREFERRED EMBODIMENT

Figure 1:
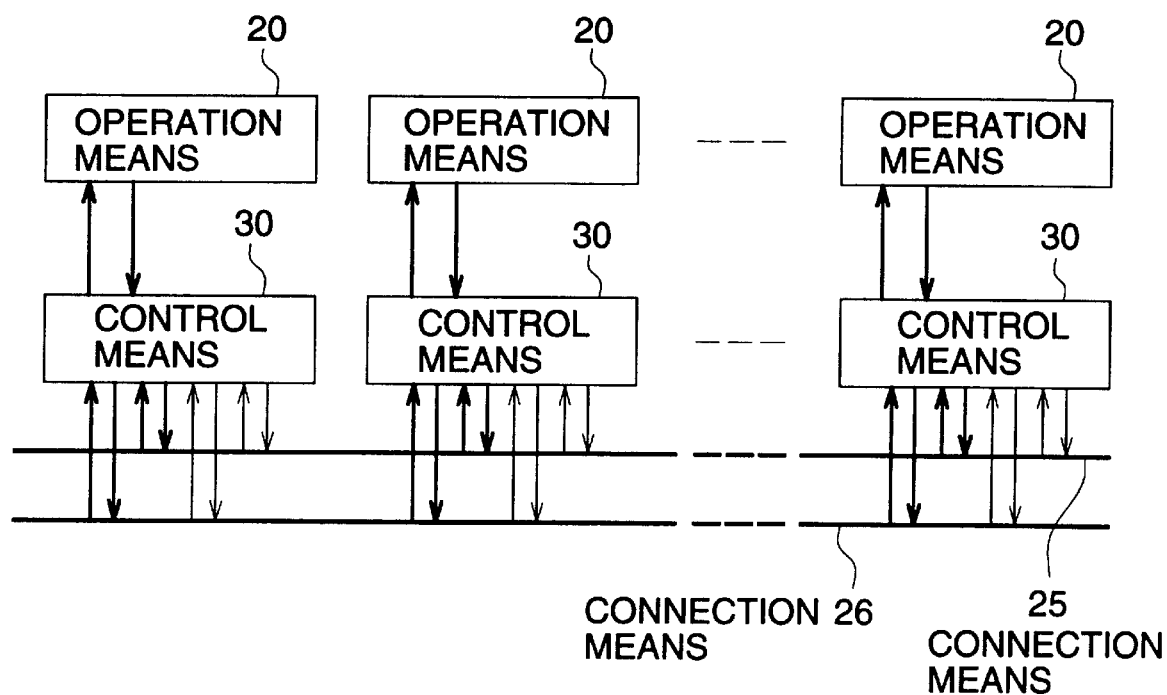
FIG. 1 is a block diagram showing the principle of the present invention.

Referring to the drawings, an example of an embodiment of the present invention will be detailed below.

Figure 2:
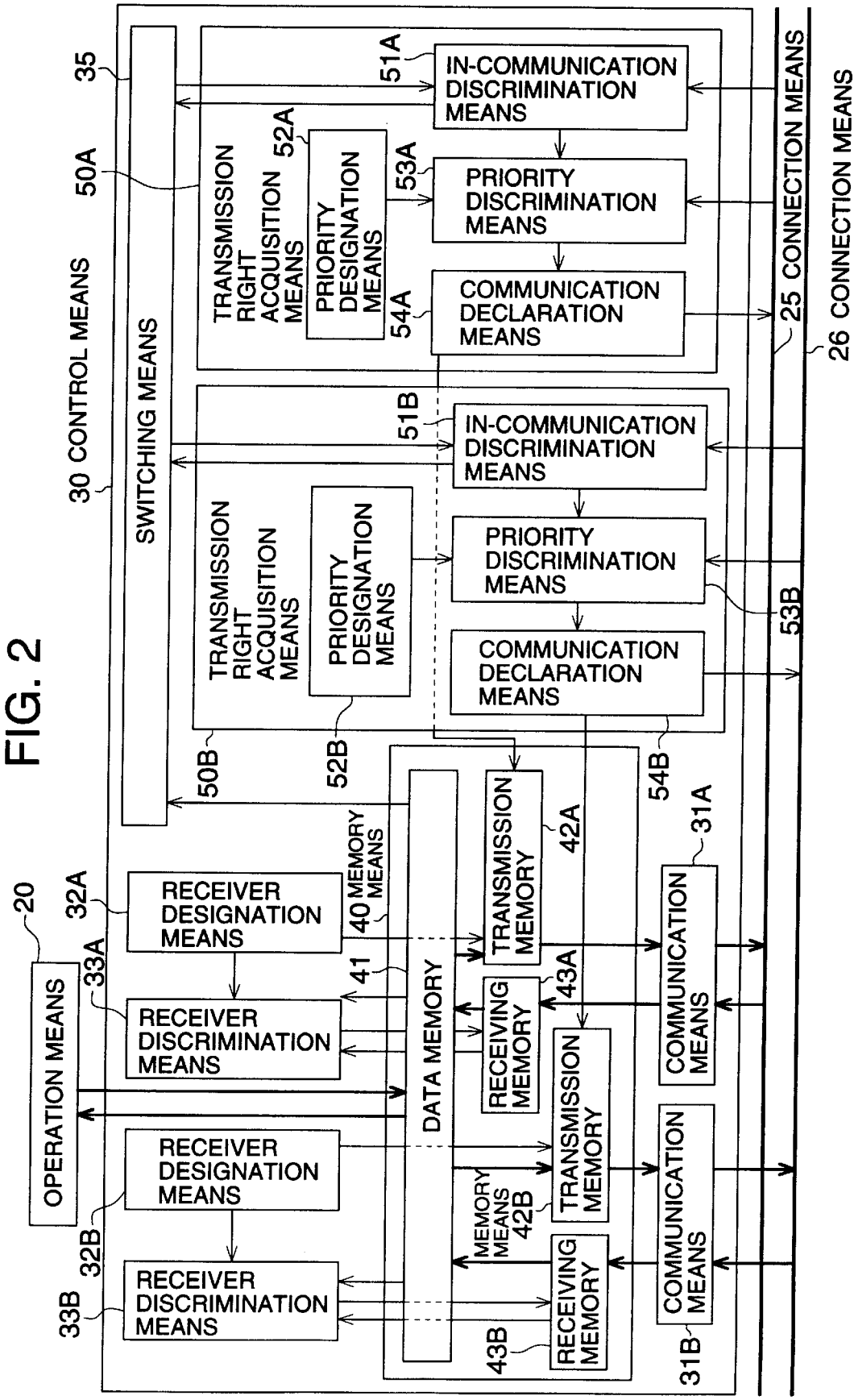
FIG. 2 is a block diagram showing Example 1 of an embodiment of a main portion of the present invention.

FIG. 1 is a block diagram of the principle of the present invention. FIG. 2 is an example of an embodiment of a main portion of the present invention. As shown in FIG. 1, the present invention is composed of a plurality of operation means 20, having functions to carry out a specific processing; at least 2 control means 30 having a memory means to control these operation means 20; and the first connection means 25 and the second connection means 26, which connect plural control means to serially transfer data, stored in the memory means in the control means 30, to another memory means in another control means. As the connection means 25 and 26, for example, a communication line is used, and for example, the first connection means 25 is used for normal data transmission, and the second connection means is used for urgent data transmission. In thus structured control system, a transmission right acquisition means, which will be described later, is provided in the control means 30, and a control system is realized, in which conditions of response speeds, as in a case of a copier, such as, in an optical system control in which comparatively high speed response is required, a process control of a drum and its related devices in which an intermediate speed response is allowable, and a transfer sheet conveyance system control in which a lower speed response is allowable, are considered.

In FIG. 2, the same components as in FIG. 1 are denoted by the same numerals. In the control means 30, numeral 31A is a communication means which is connected to a communication line 25 as the first connection means, and serially transfers data. Numeral 40 is a memory means to store a plurality of command data or status data therein. Numeral 32A is a receiver designation means to designate a data receiver. Numeral 33A is a receiver discrimination means to discriminate the receiver. Numeral 50A is a transmission right acquisition means which is connected to the first communication line 25, and judges whether any control means 30 is serially transferring data; it judges whether another control means 30, having higher priority than this control means 30 itself, is declaring the communication, according to a previously specified priority, when no control means 30 is serially transferring data; and when no control means 30 is declaring the communication, this control means 30 itself declares the communication and starts the serial transferring.

Numeral 31B is a communication means, which is connected to the communication line 26 as the second connection means, and serially transfers data. Numeral 32B is a receiver designation means to designate a data receiver. Numeral 33B is a receiver discrimination means to discriminate the receiver. Numeral 50B is a transmission right acquisition means which is connected to the second communication line 26, and judges whether any control means 30 is serially transferring data; it judges whether another control means 30, having higher priority than this control means 30 itself, is declaring the communication, according to a previously specified priority, when no control means 30 is serially transferring data; and when no control means 30 is declaring the communication, this control means 30 itself declares the communication and starts the serial transferring.

In the memory means 40, numeral 41 is a data memory to store therein various data which is transferred to and received from the operation means 20. Numeral 42A is a transmission memory to store therein data which is transmitted to the communication line 25. Numeral 43A is a reception memory to store therein data received from the communication line 25. Numeral 42B is a transmission memory to store data to be transmitted to the second communication line 26. Numeral 43B is a reception memory to store therein data received from the communication line 26.

In the first transmission right acquisition means 50A, numeral 51A is an in-communication discrimination means to discriminate whether any control means 30 is in serial transfer. Numeral 52A is a priority designation means to designate the priority. Numeral 53A is a priority discrimination means to discriminate whether another control means 30, having higher priority, is declaring the communication, or not, according to the priority, previously designated by the priority designation means 52A, when it is discriminated by the discrimination output of the in-communication discrimination means 51A that no control means 30 is in serial communication. Numeral 54A is a communication declaration means to declare the communication with respect to the transmission memory 42A according to the discrimination result of the priority discrimination means 53A when the serial transferring can be carried out.

In the second transmission right acquisition means 50B, numeral 51B is an in-communication discrimination means to discriminate whether any control means 30 is in serial transfer, or not. Numeral 52B is a priority designation means to designate the priority. Numeral 53B is a priority discrimination means to discriminate whether another control means 30, having higher priority, is declaring the communication, or not, according to the priority, previously designated by the priority designation means 52A, when it is discriminated by the discrimination output of the in-communication discrimination means 51B that no control means 30 is in serial communication. Numeral 54B is a communication declaration means to declare the communication, with respect to the transmission memory 42B, according to the discrimination result of the priority discrimination means 53B when the serial transferring can be carried out.

Numeral 35 is a switching means which is connected to the first transmission right acquisition means 50A and the second transmission right acquisition means 50B, and which switches the connection means when any control means 30 is in serial transfer. This switching of the connection means is carried out in such a manner that, for example, the connection means is switched from the first connection means 25 to the second connection means 26.

The operation means 20 is a plurality of operation means to perform image processing, including sheet conveyance. In an example of the embodiment, the operation means 20 comprises devices such as a motor, a clutch, a solenoid, and sensors for status detection, or the like, and is connected to the control means 30 through an interface means (for example, a buffer or a driver circuit). Operations of the thus structured circuits will be described as follows.

(Transmission sequence)

When any change (for example, from "off" to "on", from "on" to "off", an increase/decrease of voltage/current) occurs in a sensor for status detection, this information is stored in a data memory 41 of the memory means 40 in the control means 30, and thereby, a transmission requiring event (flag) in the memory means 40 is set. When the transmission requiring event is set, the control means 30 acquires the transmission right by the transmission right acquisition means 50A, and carries out the transmission. The control means 30 checks, using the in-communication discrimination means 51A of the transmission right acquisition means 50A, whether the communication line 25 (connection means) is empty or not. In an example of an embodiment, which will be described later, when a BUSY & LATCH signal is on a low level, it is discriminated that a control means 30 is in communication.

When the BUSY & LATCH signal is on a high level, it means that the communication line 25 is empty. Accordingly, the control means 30 checks, using the priority discrimination means 53A whether the control means 30, having priority higher than that of this control means itself, previously determined by the priority designation means 52A, is declaring the communication. When no control means 30 having higher priority is declaring the communication, this control means 30 itself declares the communication by the communication declaration means 54A, and starts the transmission. The above operations are the same as operations on the second transmission right acquisition means 50B-side.

In Example 1 of the embodiment, which will be described later, the priority designation means 52*a* is composed of a count register in which the priority count number is set. The priority discrimination means 53*a* is composed of a cyclic counter to count a X & CLOCK, a comparator and an AND gate. The count register and the cyclic counter are compared to each other by the comparator. Then, an AND-operation of the compared result and the BUSY & LATCH signal is carried out. In the case where the compared result coincides with the BUSY & LATCH signal, the BUSY & LATCH signal is lowered to the low level when the BUSY & LATCH signal is on the high level, and the communication is declared and the transmission is started. The above operations are the same as operations on the second transmission right acquisition means 50B-side.

In Example 2 of the embodiment, which will be described later, the priority designation means 52A is composed of the connection from the higher priority section to the lower priority section of a PRIORITY signal (the higher priority of adjoining priorities corresponds to an output, and the lower priority of the adjoining priorities corresponds to an input, and an output from the high priority section is logically summed up with an input from the higher priority section, and is then outputted). The priority discrimination means 53A is composed of a PRIORITY-IN, and the communication declaration means 54A is composed of a PRIORITY-OUT. Initially, the PRIORITY-OUT is lowered to the low level and the communication declaration means 54A declares the communication. When it is judged that the PRIORITY-IN is at the low level, the PRIORITY-OUT is raised to the high level and the communication declaration is canceled. When it is judged that the PRIORITY-IN is at the high level, the communication declaration is not canceled out, and the transmission is started.

The transmission is started as follows: data to be transmitted is read from a data memory 41 of the memory means 40, and is set to a transmission memory 42*a*; the receiver data generated by the receiver designation means 32*a* is added to the above data as an ID; and the data is serially transmitted into the communication line 25 by the communication means 31A. The above operations are the same as those on the second communication line-side 26.

(Reception sequence)

During data reception, data is serially received from the communication line 25 by the communication means 31A, and the received data is temporarily stored in a reception memory 43A. The control means 30 checks data in the reception memory 43A by the receiver discrimination means 33A whether the data is transmitted to the control means 30 itself. When the data is transmitted to the control means 30 itself, the data is stored in the data memory 41, and if not, the data in the reception memory 43A is discarded.

In an example of the embodiment, the receiver discrimination means 33A is composed of a data register, in which the ID of the receiver discrimination means 33A itself is set, and a comparator. The receiver data read from data stored in the reception memory 43A and the data register are compared with each other by the comparator, and when the comparison result is the same, data in the reception memory 43A is set in the data memory 41. The control means 30 on/off-controls loads (operation means 20) such as a motor, a clutch, a solenoid, corresponding to the content of the data stored in the data memory. The above operations are the same as those on the second communication line-side 26.

(1) Example 1 of the embodiment (the priority discrimination by pulse counting)

In Example 1 of the embodiment, an example, in which the inside of a copier is divided into 9 blocks to be controlled, will be described. A block (control means) 30 is composed of a control block (#1) to perform the entire system control and the operation panel control; an optical block (#2) to perform the optical system control such as a scanner control, or the like; an ADF block (#3) to perform the document conveyance control, or the like; a drum block (#4) to perform the process control of a drum and its relating devices; a sheet feed block (#5) to perform the transfer sheet conveyance control, or the like; a PFU/LCT block (#6) to perform the transfer sheet conveyance control from an option sheet feed unit; an ADU block (#7) to perform the transfer sheet conveyance control of a double-sided copy unit; an AC block (#8) to perform the AC system control of a fixing heater, or an exposure lamp; and an STR block (#9) to perform the transfer sheet collation control, or the like.

Figures 3, 4:
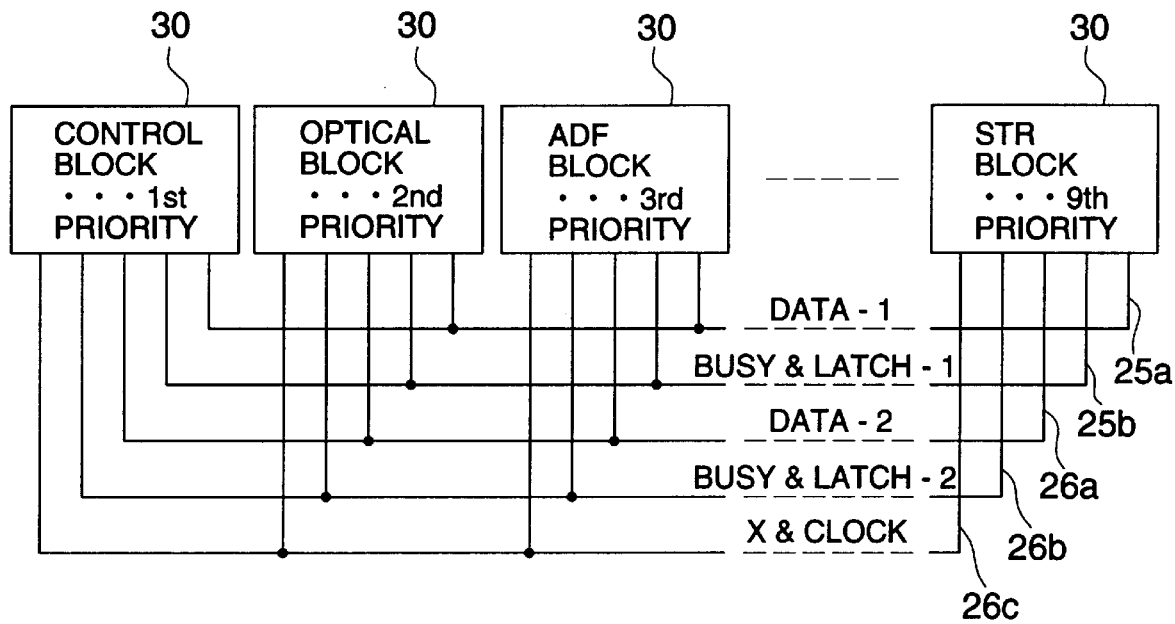
FIG. 3 is a view showing an example of a structure of the connection of Example 1 of the embodiment.
FIG. 4 is a view explaining a communication line used for Example 1 of the embodiment.

FIG. 3 is a view showing an example of the structure of connection in Example 1 of the embodiment. The above-described 9 blocks (the control means) 30 are arranged from #1 to #9. These blocks 30 are respectively connected to the first communication line 25 composed of a DATA-1 communication line 25a, a BUSY & LATCH-1 communication line 25b and an X & CLOCK communication line 25c, and the second communication line 26 composed of a DATA-2 communication line 26a, and a BUSY & LATCH-2 communication line 26b. Regarding the priority, the control block #1 is the first priority, and the priority is sequentially set in order from the control block #1 to the STR block #9.

FIG. 4 is an illustrative view of the communication line used in Example 1 of the embodiment. In FIG. 4, DATA-1 is composed of data, command, and ID signals, of the first communication line (refer to FIG. 7). BUSY & LATCH-1 is composed of the in-communication and data latch signal of the first communication line. X & CLOCK is composed of a synchronous clock for the priority judgment and the serial communication, and the synchronous clock can also be used as the original oscillation in a block having no original oscillation. DATA-2 is composed of data, command, and ID signals, of the second communication line, and BUSY & LATCH-2 is an in-communication and data latch signal of the second communication line.

DATA-1, DATA-2, BUSY & LATCH-1, BUSY & LATCH-2 are two-way signals which can be inputted into and outputted from each operation block. In X & CLOCK, one block is output, and the other block is input, and either can be arbitrarily set as to which block is set for an output. In the example of the present embodiment, the control block #1 is set for a clock output block. In the example of the present embodiment, the X & CLOCK is commonly used by the first communication line 25 and the second communication line 26, however, of course, the first communication line 25 my be separately provided from the second communication line 26.

Further, although not shown, DATA-3 and BUSY & LATCH-3 may be added to the block in order to provide the third communication line (connection means), and of course, when DATA-n (n is integer), and BUSY & LATCH-n are added to the block, n-th communication line can be provided.

Figures 5, 6:
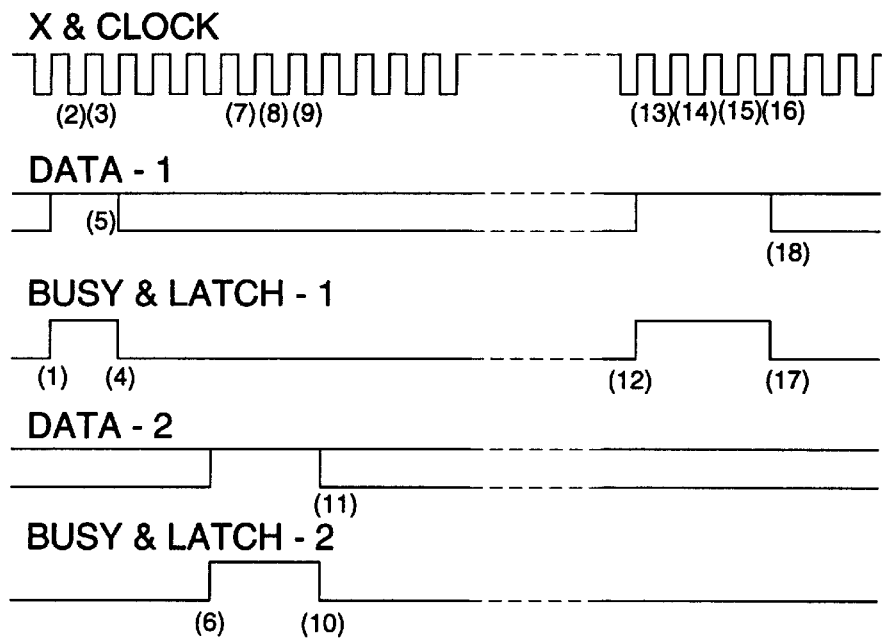
FIG. 5 is a view showing an example of a transmission right acquisition timing chart of Example 1 of the embodiment.
FIG. 6 is a view explaining the priority of each block of Example 1 of the embodiment.

FIG. 5 is a view showing an example of the transmission right acquisition timing chart of Example 1 of the embodiment, and shows a case in which the transmission requirement event is generated in the optical block #2, the ADF block #3, and the drum block #4 while any block is using both the first communication line 25 and the second communication line 26 for communication. The priority of each block is as shown in FIG. 6, and the priority is provided to each block sequentially from the higher ranked block, such as from the control block #1 to the optical block #2, to the ADF block #3, to the drum block #4 .... These priorities are the number of counts of an X & CLOCK, (which will be described later). In the present invention, the same priority designation is prohibited as shown in FIG. 6. Accordingly, collision of data at each control means can be prevented.

Initially, when the communication of any block has been completed in the first communication line 25 at timing (1), in synchronization with the leading edge of th e X & CLOCK, the BUSY & LATCH-1 rises. Then, all blocks start the count of the trailing edge of the X & CLOCK, regarding the leading edge of the BUSY & LATCH-1 as the original point, and the priority comes to the control block #1 at timing (2) at which one trailing edge is counted. As described above, the transmission requirement event is not generated in the control block #1, and therefore, the control block #1 discards the priority. Next, priority is assigned to the optical block #2 at timing (3) at which 2 trailing edges are counted.

In the optical block #2, the transmission requirement event is generated as described above, thereby, the BUSY & LATCH-1 falls at timing (4) synchronized with the leading edge of the X & CLOCK, and acquires the transmission right. The output of data of the DATA-1 is started to the DATA-1 communication line 25a at timing (5), synchronized with the leading edge of the same X & CLOCK. In this connection, DATA-1 is read in synchronization with the trailing edge of the X & CLOCK. The transmission requirement event of the optical block #2 is cleared after the transmission right has been acquired.

Next, when the in-communication discrimination means 51A in the first transmission right acquisition means 50A of each block recognizes that the first communication line 25 is in communication, the in-communication discrimination means 51A informs that information to the switching means 35. The switching means 35, having received that information, switches the connection from the first communication line 25 to the second communication line 26.

Then, when communication by any block has been completed in the second communication line at timing (6), the BUSY & LATCH-2 rises. Then, all blocks start the count of the trailing edge of the X & CLOCK, regarding the leading edge of the BUSY & LATCH-2 as the original point, and when the transmission requirement event is not generated in the control block #1 and the optical block #2, nothing occurs at timing (7) and (8). Then, the priority is assigned to the ADF block #3 at timing (9) at which 3 trailing edges are counted. In the ADF block #3, the transmission requirement event is generated as described above, thereby, the BUSY & LATCH-2 falls at timing (10) synchronized with the leading edge of the X & CLOCK, and acquires the transmission right. The output of data of the DATA-2 is started to the DATA-2 communication line 26a at timing (11) synchronized with the leading edge of the same X & CLOCK. The transmission requirement event of the ADF block #3 is cleared after the transmission right has been acquired.

Next, when the in-communication discrimination means 51B in the second transmission right acquisition means 50B of each block recognizes that the second communication line 26 is in communication, the in-communication discrimination means 51B informs that information to the switching means 35. The switching means 35 which has received that information, switches the connection from the second communication line 26 to the first communication line 25.

Then, communication by the optical block #2 has been completed at timing (12), and the BUSY & LATCH-1 rises. Then, all blocks start the count of the trailing edge of the X & CLOCK, regarding the leading edge of the BUSY & LATCH-1 as the original point, and when the transmission requirement event is not generated in the control block #1, the optical block #2, and the ADF block #3, nothing occurs at timing (13), (14) and (15). Following that, priority is assigned to the drum block #4 at timing (16) at which 4 trailing edges are counted.

In the drum block #4, the transmission requirement event is generated as described above, and thereby, the BUSY & LATCH-1 falls at timing (17) synchronized with the leading edge of the X & CLOCK, and acquires the transmission right. The output of data of the DATA-1 is started to the DATA-1 communication line 25a at timing (18) synchronized with the leading edge of the same X & CLOCK. The transmission requirement event of the drum block #4 is cleared after the transmission right has been acquired. After this, the same operations are repeated.

Figures 7, 8:
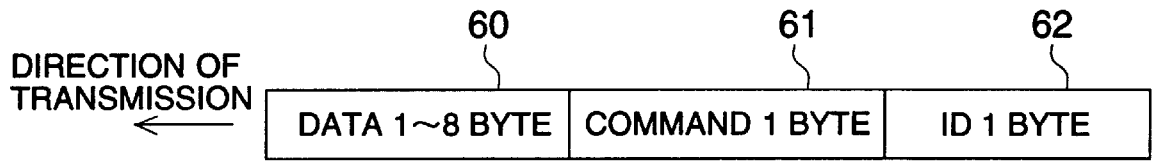
FIG. 7 is a view showing an example of the structure of a data formatting of Example 1 of the embodiment.
FIG. 8 is a view explaining functions of commands used for Example 1 of the embodiment.

FIG. 7 is a view showing an example of the structure of a format of data in Example 1 of the embodiment. As shown in the drawing, the format is composed of a data signal 60, a command signal 61, and an ID signal 62. The data signal 60 can be arbitrarily set between 1~8 bytes. The command signal 61 is composed of 1 byte, and is used as a classification code for each function of the data signal as shown in FIG. 8. In this example of the embodiment, the higher 4 bits are used for the classification of the function, and are sufficient for the classification, thereby, the lower 4 bits are not defined. For example, "0" is used as a communication function, and "1" is used for an I/O function. The following bits are defined similarly.

Figures 9, 10:
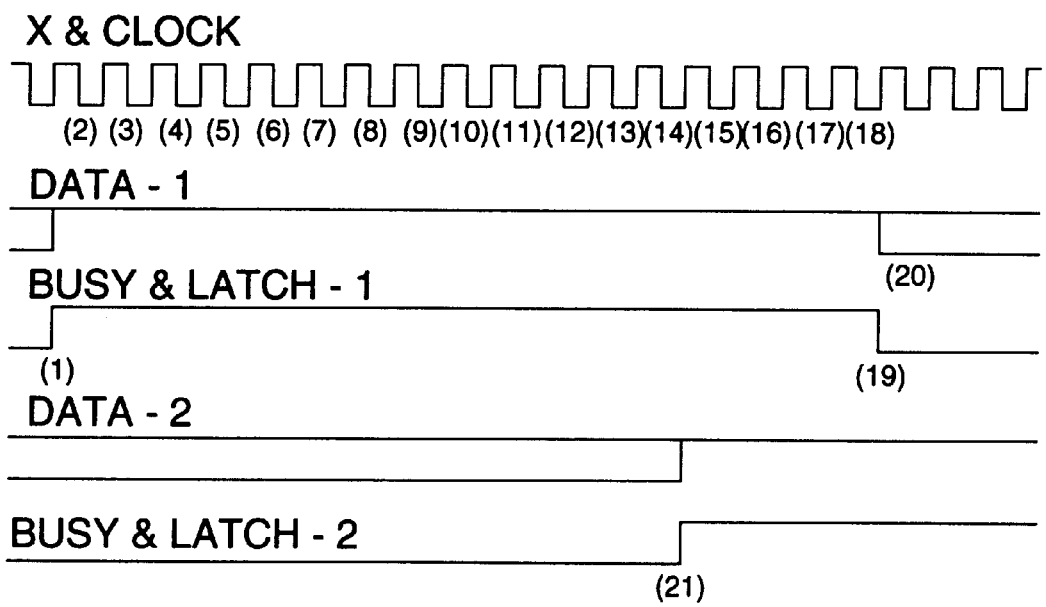
FIG. 9 is a view explaining an ID signal used for Example 1 of the embodiment.
FIG. 10 is a view showing another example of the transmission right acquisition timing chart of Example 1.

The ID signal 62 is composed of 1 byte, and is used as an ID number of the receiver and the transmitter as shown in FIG. 9. As shown in FIG. 9, "1"~"9" of the higher 4 bits are used as the transmitter ID number, and "1"~"9" of the lower 4 bits are used as the receiver ID number. In this connection, the above numerals expressed by " " represent hexadecimals.

Specifically, the ID signal 62 can be structured such that a special number, which is used for a non-specific block, is previously prepared for the ID number, and when the number is designated as the ID number of the receiver, the receiver is composed of a plurality of blocks. Example 1 of the present embodiment is structured such that the receiver corresponds to all the blocks, when "0" is designated as the ID number. Further, Example 1 of the present embodiment is structured such that ID numbers coincide with the priorities shown in FIG. 6.

FIG. 10 shows another example of the transmission right acquisition timing chart used in Example 1 of the embodiment, and shows a motion when the transmission requirement event is not generated in any block for several periods of time. Initially, when the communication of any block has been completed in the first communication line 25 at timing (1), in synchronization with the leading edge of the X & CLOCK, the BUSY & LATCH-1 rises. Then, all blocks start the count of the trailing edge of the X & CLOCK, regarding the leading edge of the BUSY & LATCH-1 as the original point.

However, the transmission requirement event is not generated in any block, and thereby, the priority makes one round at timing (10) of 9 counts. Then, all blocks cyclically repeat the counting, regarding the following timing (11)as the first count, to wit as 1 . 2 . 3 . . 8 . 9 . 1 . 2 . 3 . ..

Herein, it is assumed that the transmission requirement event is generated in any block after the passage of several periods of time. For example, it is assumed that the transmission requirement event is generated in the AC block #8 after timing (9) which is the 8th count in one counting cycle. Then, when the priority comes to the AC block #8 at timing (18) which is the 8th count in the 2 counting cycles, the BUSY & LATCH-1 falls at timing (19), synchronized with the leading edge of the X & CLOCK, and the AC block #8 acquires the transmission right.

Then, the output of data of the DATA-1 is started to the DATA-1 communication line 25a at timing (20) synchronized with the leading edge of the same X & CLOCK. In this case, when the communication of any block has been completed in the second communication line 26 at timing (21), the BUSY & LATCH-2 rises. Then, all blocks start the count of the trailing edge of the X & CLOCK, regarding the leading edge of the BUSY & LATCH-2 as the original point.

Figure 11:
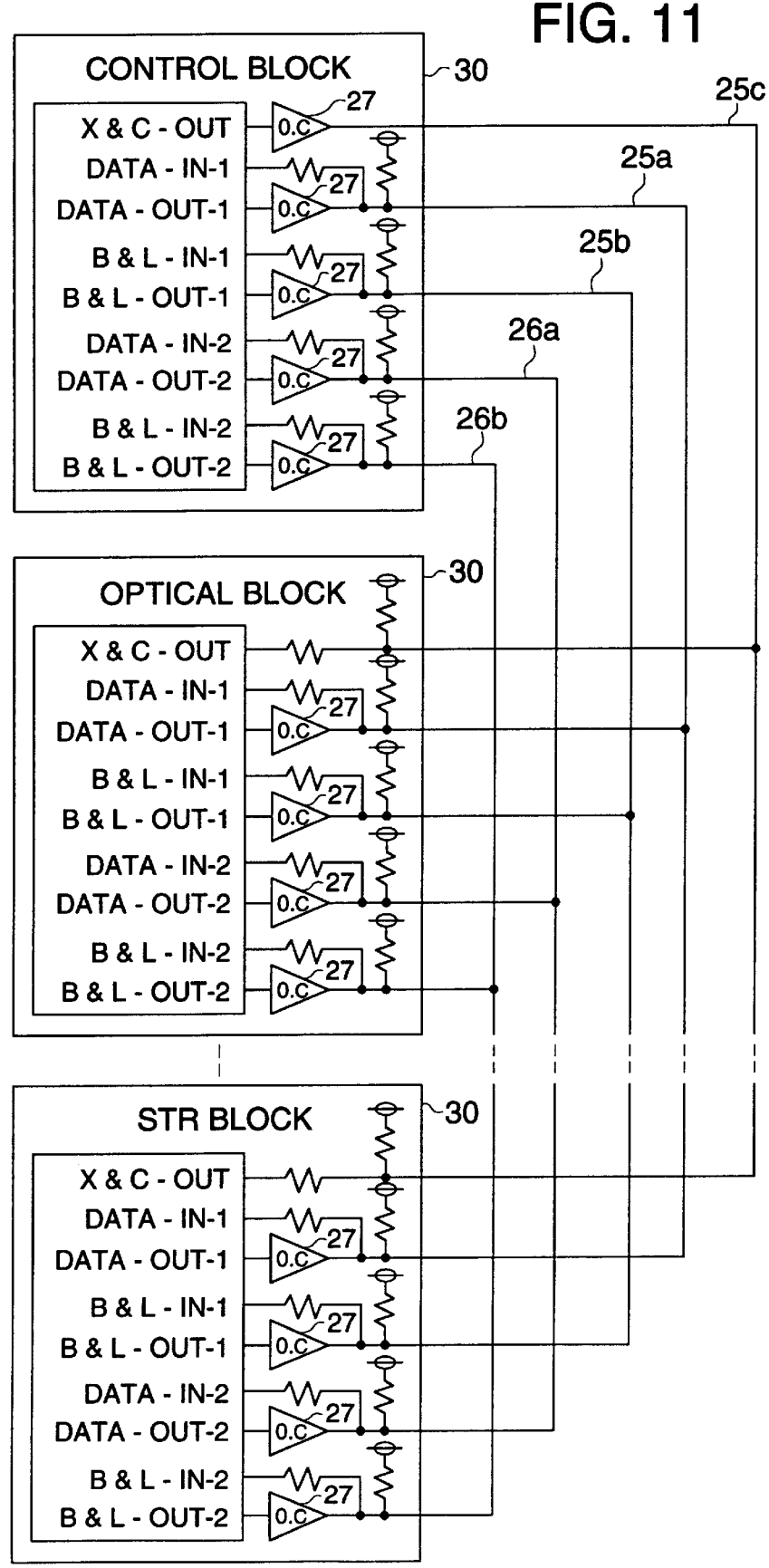
FIG. 11 is a view showing an example of the structure of connections among control means of Example 1.

FIG. 11 is a view showing an example of the structure of the connection between blocks (control means) of Example 1 of the embodiment. Identical blocks in FIG. 3 are denoted by the same numerals. Numeral 27 in each block is an open-collector transistor. Example 1 is structured such that the clock is outputted from the control block #1 to the communication line 25c for the X & CLOCK, and the clock signal is inputted to other blocks through the communication line 25c. The open collector transistor of each block is connected to the DATA-1 communication line 25a, or the DATA-2 communication line 26a. DATA-OUT-1, DATA-IN-1, DATA-OUT-2, and DATA-IN-2 of each block are connected to the DATA-1 and DATA-2 communication lines 25a, 26a respectively, and the two-way signal circuit is structured in that manner. Further, BUSY & LATCH-OUT-1, BUSY & LATCH-IN-1, BUSY & LATCH-OUT-2, BUSY & LATCH-IN-2 are connected to the BUSY & LATCH-1 communication line 25b and the BUSY & LATCH-2 communication line 26b, and thus a two-way signal circuit is formed.

As just described, due to Example 1 of the embodiment, the control circuit 30 is composed of the first and second transmission right acquisition means 50A and 50; one of these transmission right acquisition means, provided in the control means 30, judges whether any of control means 30 is in serial transmission or not; when no control means 30 is in serial transmission, the transmission right acquisition means judges, according to the previously designated priority, whether another control means 30, having higher priority than this control means 30 itself, declares the communication; when no other control means 30 declares the communication, this control means 30 itself declares the communication, and starts the serial transmission; when any control means 30 is in serial transmission, the connection means is switched by the switching means 35, and another transmission right acquisition means judges whether this control means 30 itself can declare the communication or not; and when the control means 30 itself can declare the communication, the control means 30 itself starts the serial transmission. Accordingly, in a LAN system in which the communication line are commonly used by a plurality of control means 30, a control system, in which urgent communication can be carried out first, and conditions of the response speed are further considered, can be provided for the conditions of the response speeds such as, in cases of copiers, in the optical control in which comparatively high speed response is required, the process control of the drum and its relating devices in which an intermediate response speed is allowable, and the transfer sheet conveyance control system in which the lower speed response is allowable.

(2) Example 2 of the embodiment (Priority discrimination using a high order/low order connection)

In example 2 of the embodiment, in the same way as in Example 1 of the embodiment, an example, in which the inside of a copier is divided into 9 blocks to be controlled, will be described. A block (control means) 30 is composed of a control block (#1) to perform the entire system control and the operation panel control; an optical block (#2) to perform the optical system control such as a scanner control, or the like; an ADF block (#3) to perform the document conveyance control, or the like; a drum block (#4) to perform the process control of a drum and its relating devices; a sheet feed block (#5) to perform the transfer sheet conveyance control, or the like; a PFU/LCT block (#6) to perform the transfer sheet conveyance control from an option sheet feed unit; an ADU block (#7) to perform the transfer sheet conveyance control of a doublesided copy unit; an AC block (#8) to perform the AC system control of a fixing heater, or an exposure lamp; and an STR block (#9) to perform the transfer sheet collation control, or the like.

FIG. 12 is a view showing an example of the structure of connection in Example 2 of the embodiment. In FIG. 12, identical components as in FIG. 3 are denoted by the same numerals. The above-described 9 blocks (the control means) 30 are arranged from #1 to #9. These blocks 30 are respectively connected to 7 common communication lines 25a–25d, 26a–26c including DATA-1, BUSY & LATCH-1, X & CLOCK, PRIORITY-1, DATA-2, BUSY & LATCH-2 and PRIORITY-2. In the drawing, numeral 25d shows the PRIORITY-1 communication line, numeral 26c shows the PRIORITY-2 communication lines, and other communication lines are shown in the same way as in FIG. 3. In the same manner as in Example 1 of the embodiment, in terms of priority, the control block #1 has the first priority, and the priority is sequentially set in this order from the control block #1 to the STR block #9.

FIG. 13 is a view explaining the communication lines used in Example 2 of the embodiment. In FIG. 13, PRIORITY-1 is a priority judgment signal for transmission right acquisition of the first communication line 25. DATA-1 is composed of data, command, and ID signals. BUSY & LATCH-1 is composed of in-communication judgment and data latch signals. PRIORITY-2 is a priority judgment signal for transmission right acquisition of the second communication line 26. DATA-2 is composed of data, command, and ID signals. BUSY & LATCH-2 is composed of in-communication judgment and data latch signals. X & CLOCK is composed of a synchronous clock for the priority judgment and the serial communication, and the synchronous clock can also be used as the original oscillation in a block having no original oscillation. DATA-1, DATA-2, BUSY & LATCH-1, BUSY & LATCH-2 are two-way signals which can be inputted into and outputted from each operation block. In X & CLOCK, one block is output, and the other block is input, and it can be arbitrarily set which block is set for the output. In the example of the present embodiment, the control block #1 is set for the clock output block.

Figure 15:
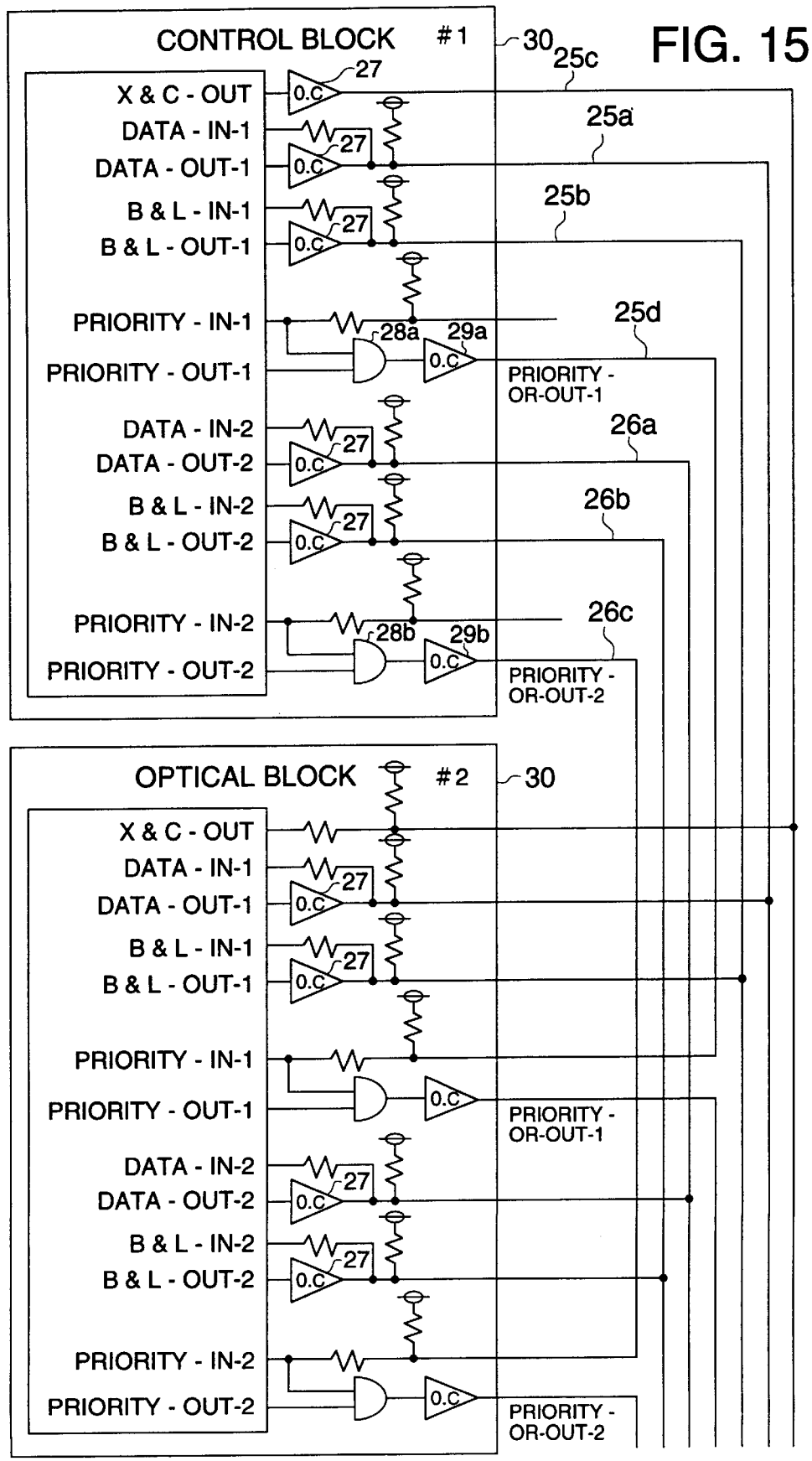
FIG. 15 is a view showing an example of the structure of connections among control means of Example 2.
Figure 16:
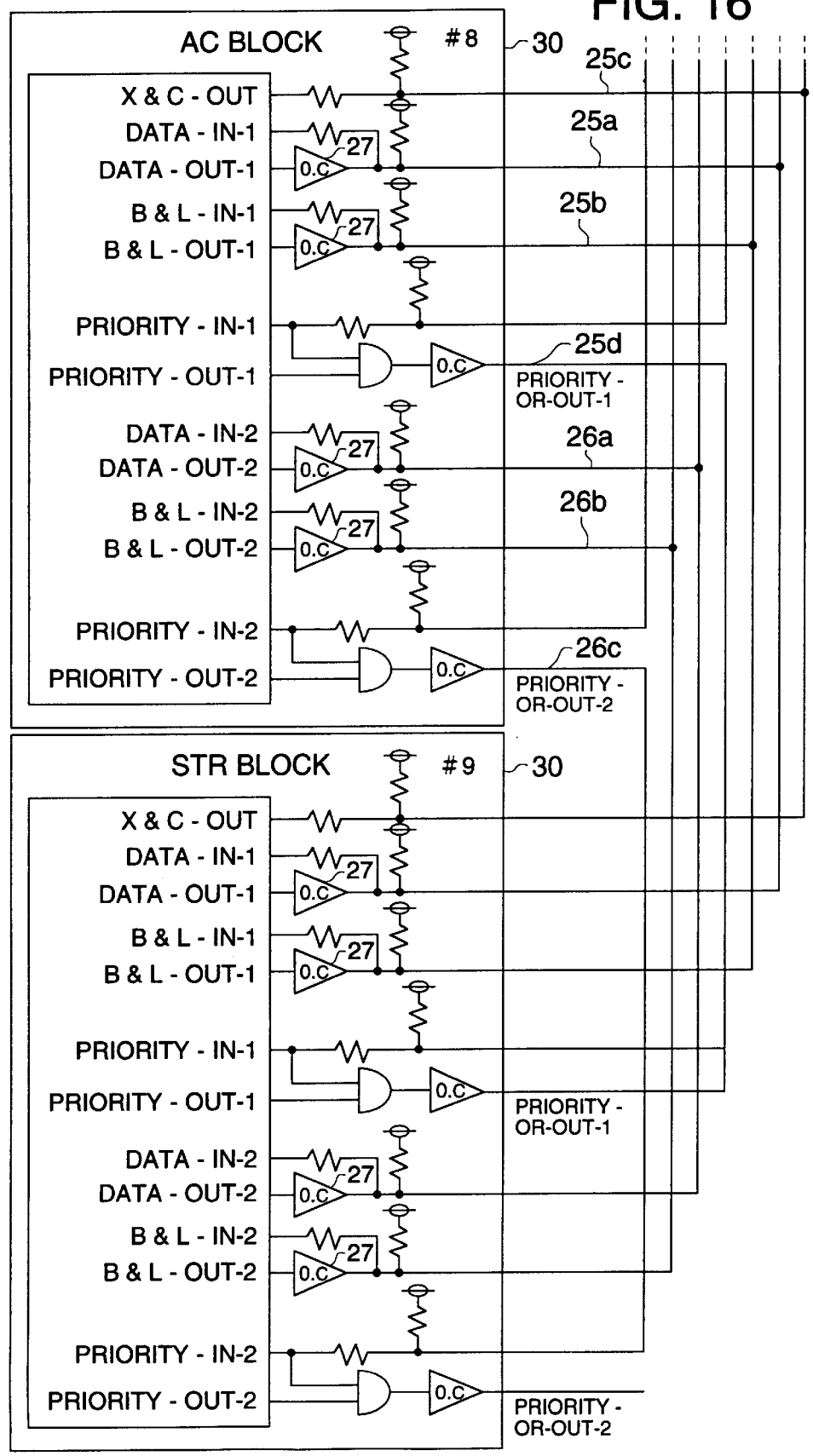
FIG. 16 is a view showing an example of the structure of connections among control means of Example 2.
Figure 17:
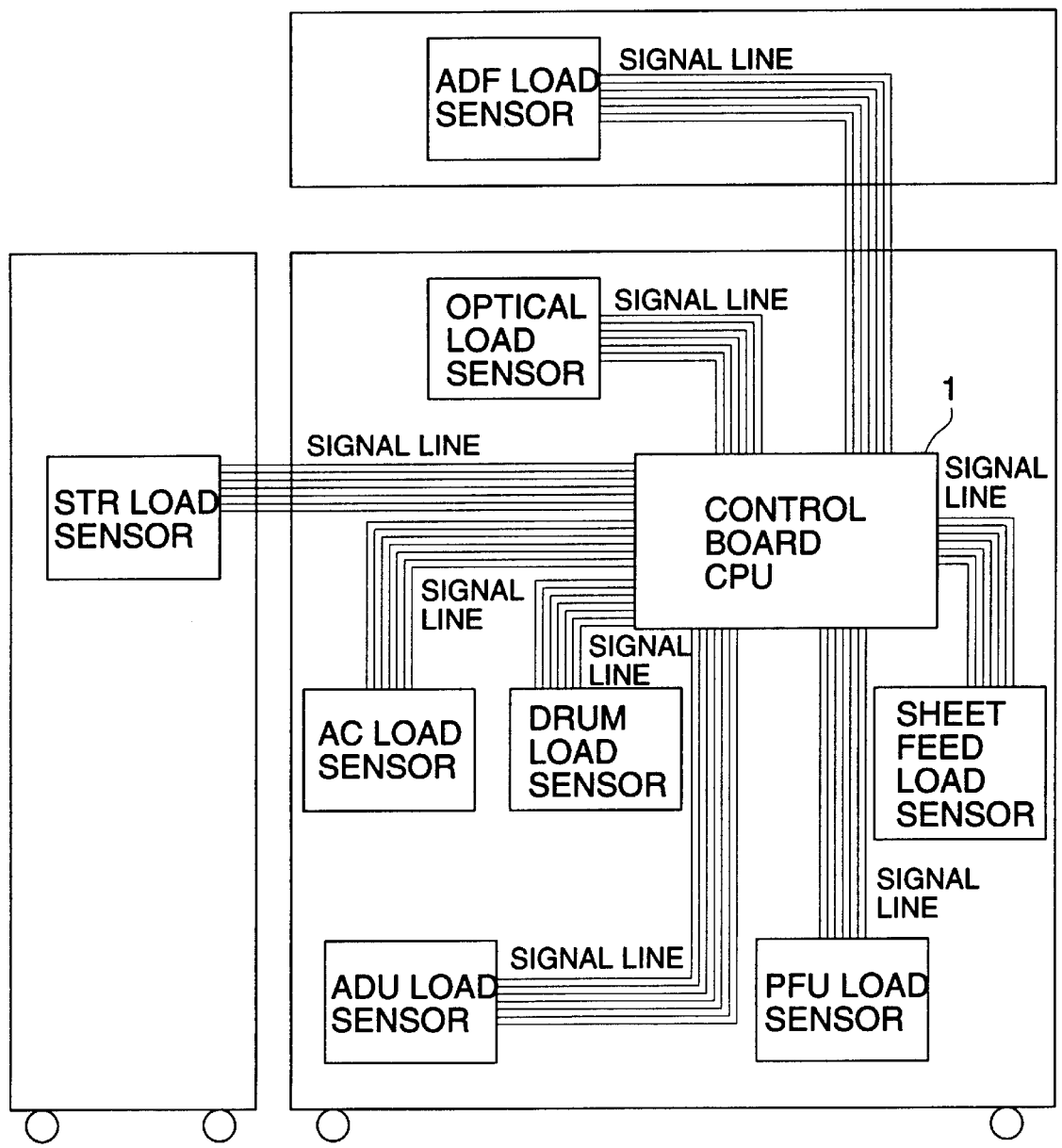
FIG. 17 is a block diagram showing an example of the structure of a conventional copier.
Figure 18:
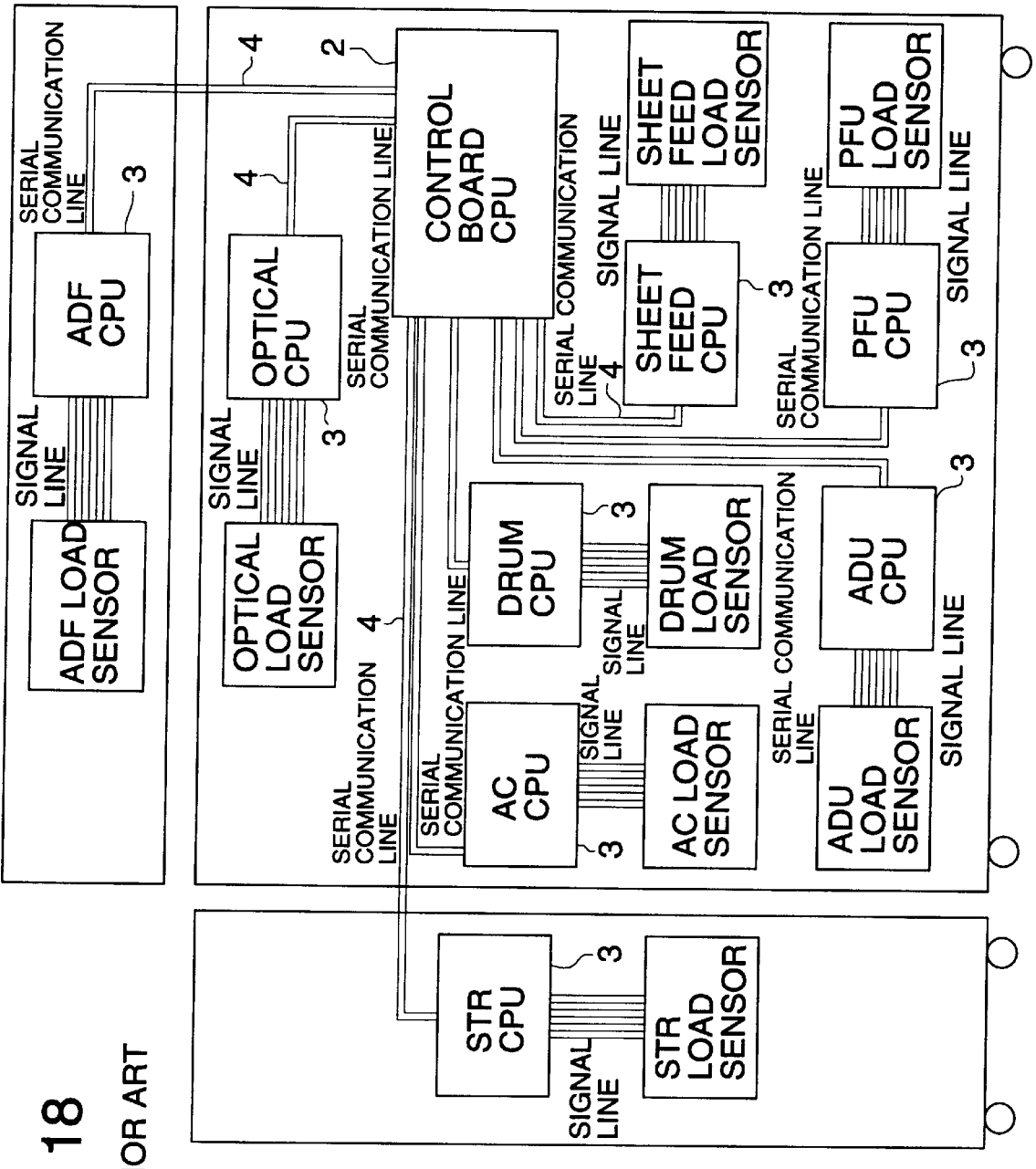
FIG. 18 is a block diagram of a distributed system of a conventional copier.
Figure 19:
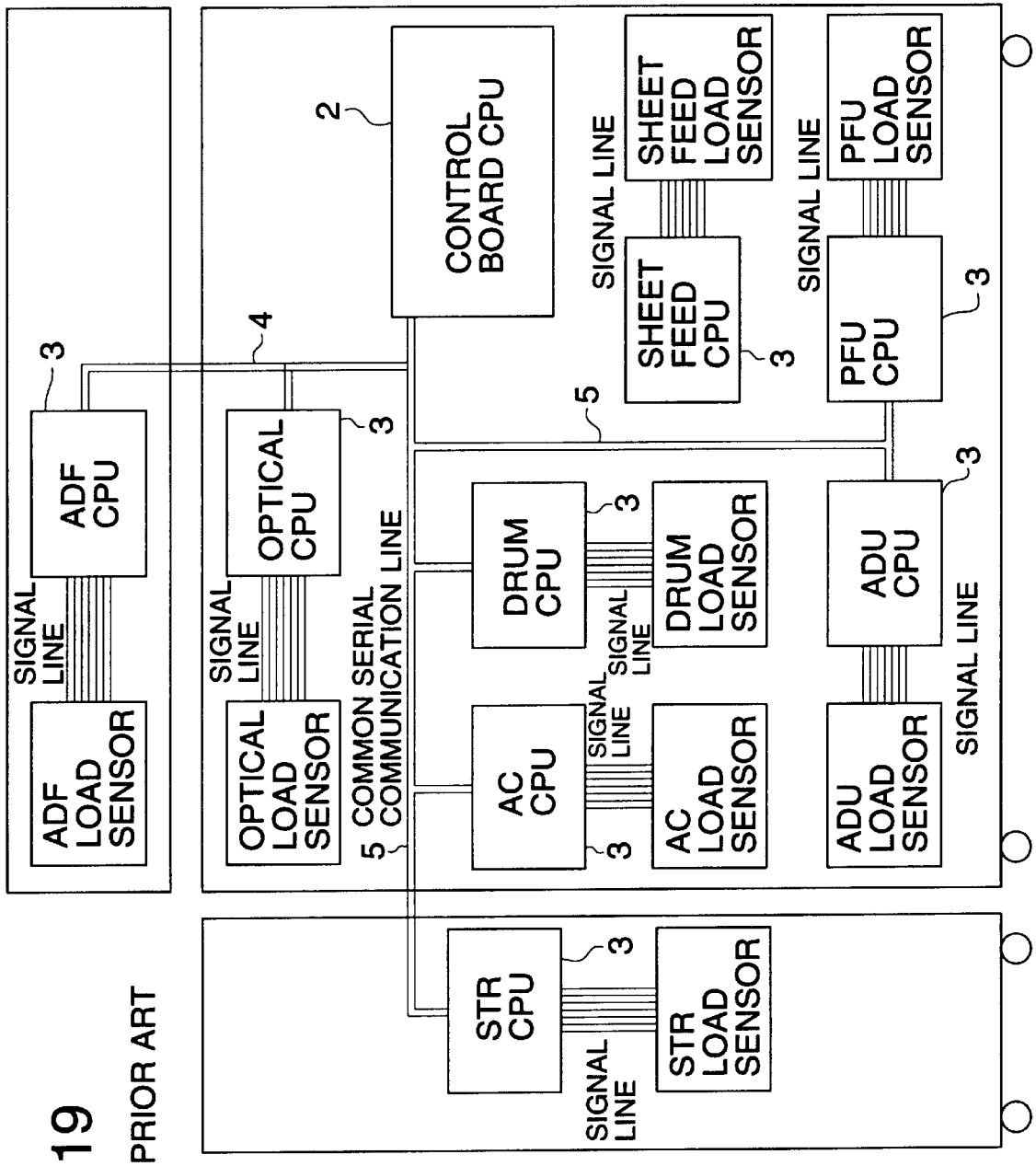
FIG. 19 is a block diagram of a distributed system of a conventional LAN system copier.
Figure 20:
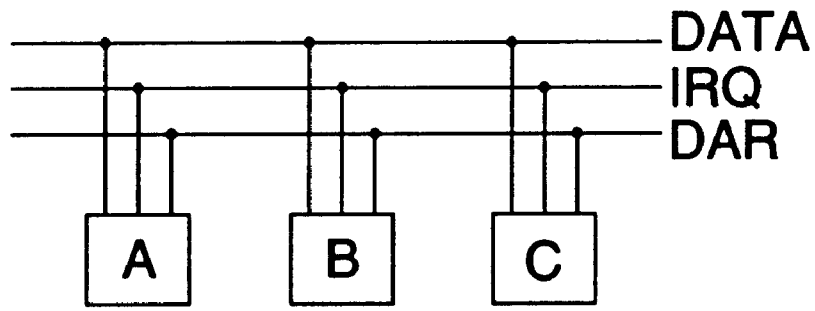
FIGS. 20(a) and 20(b) are views showing an example of a conventional LAN system.
Figure 20:
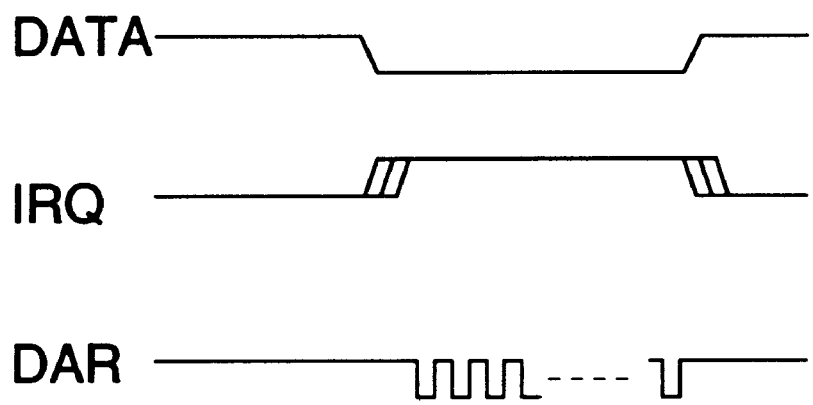
Figure 21:
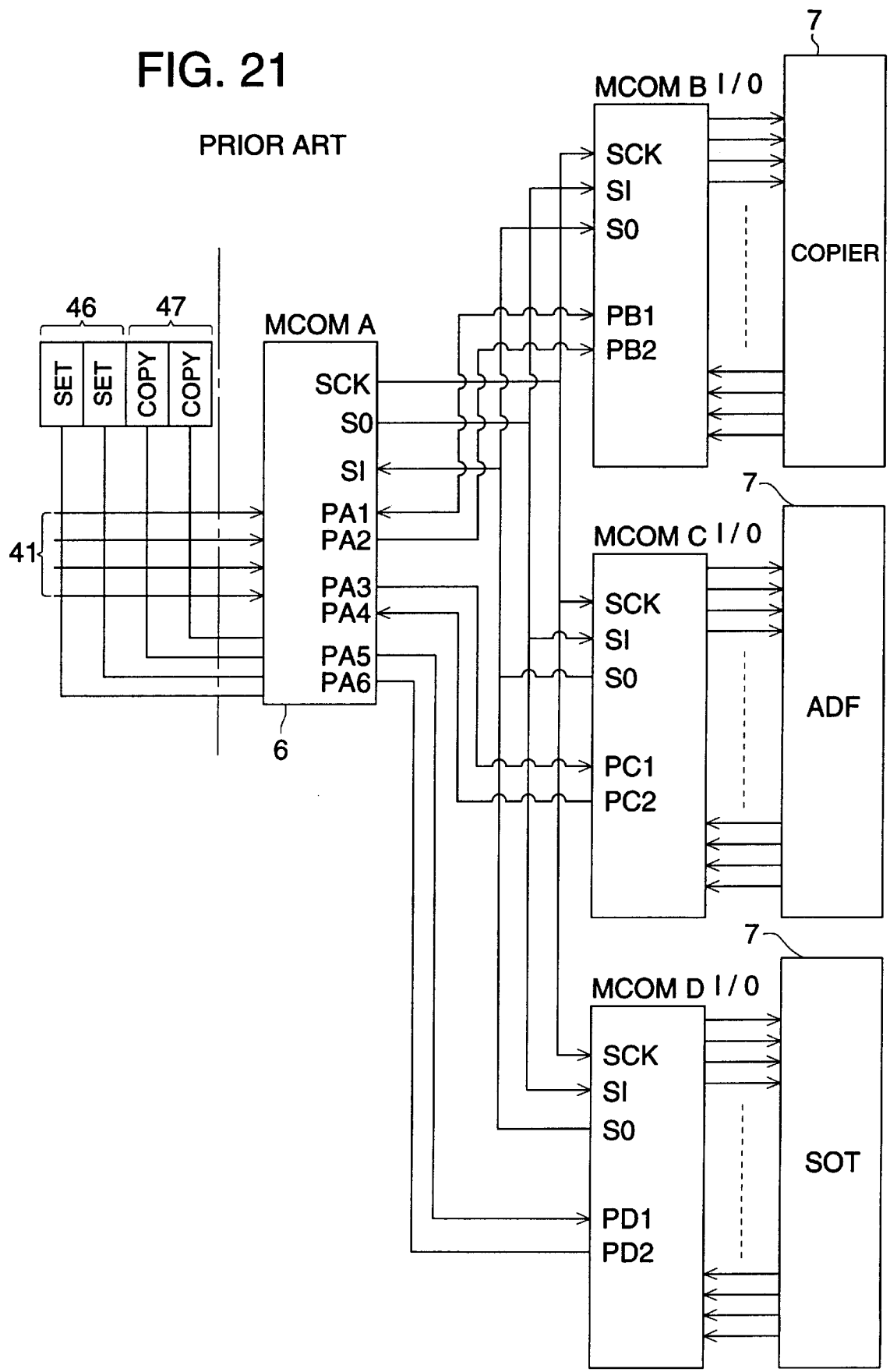
FIG. 21 is a view showing another example of a LAN system.
Figure 22:
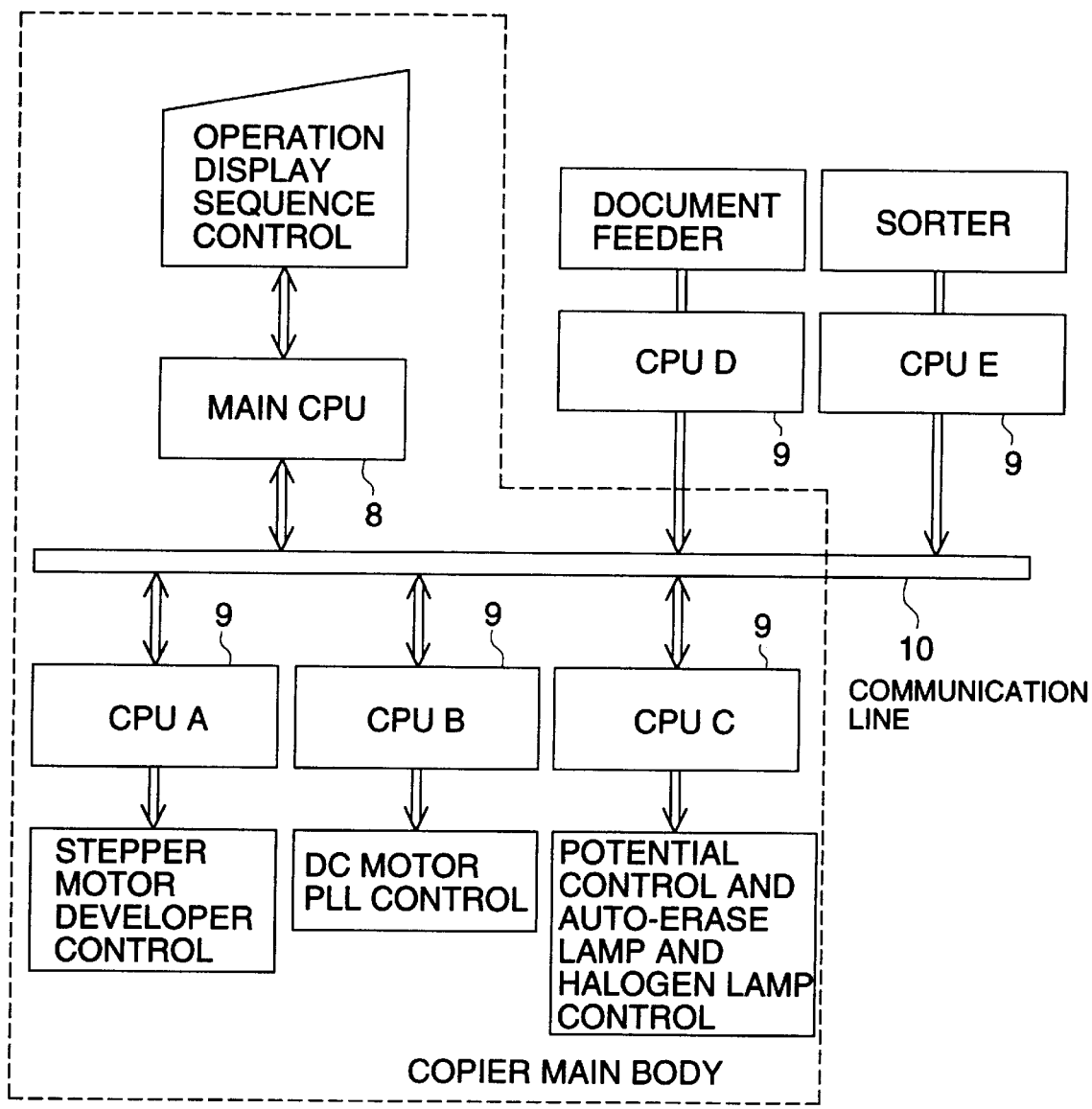
FIG. 22 is a view showing another example of a LAN system.
Figure 23:
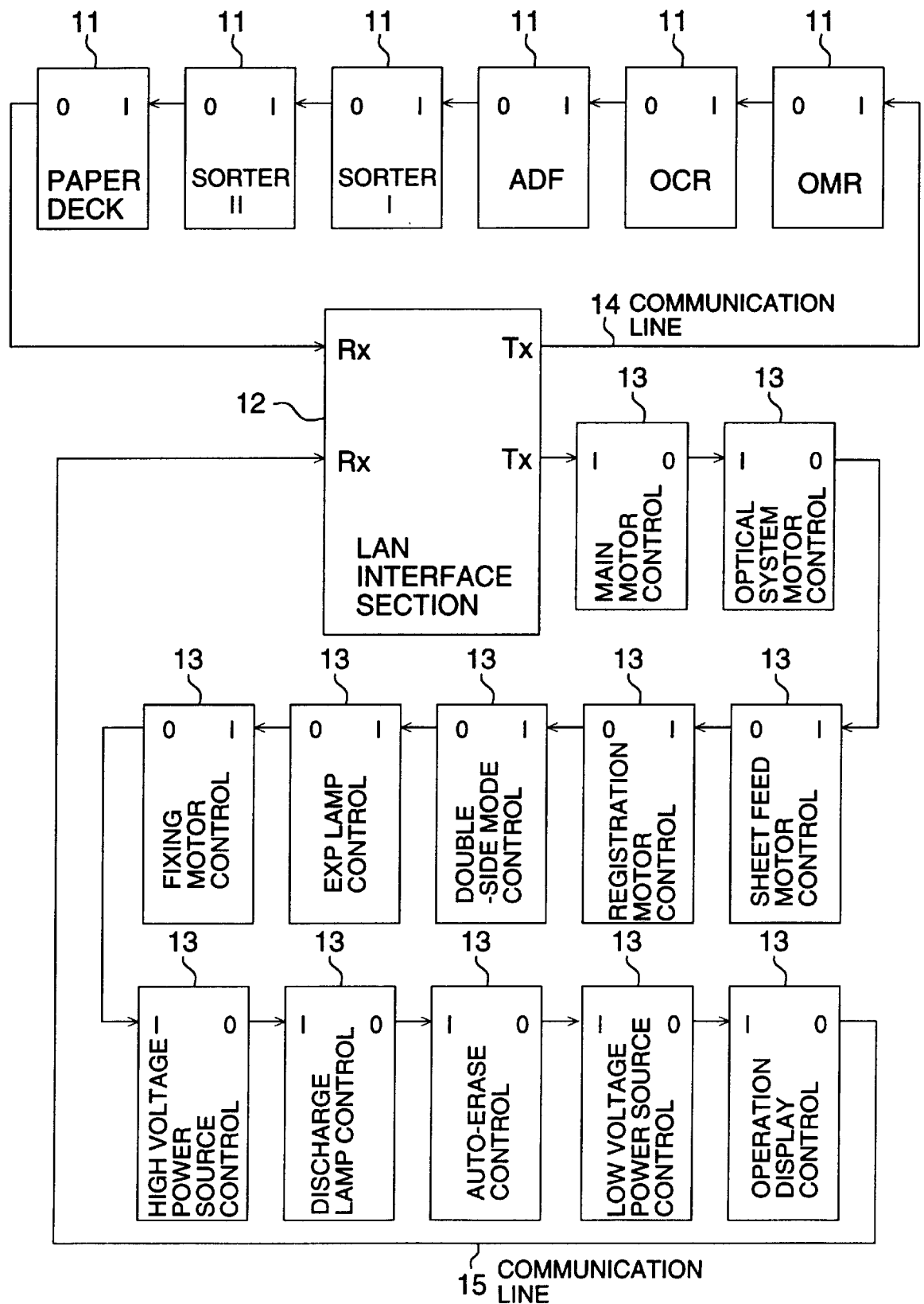
FIG. 23 is a view showing another example of a LAN system.
Figure 24:
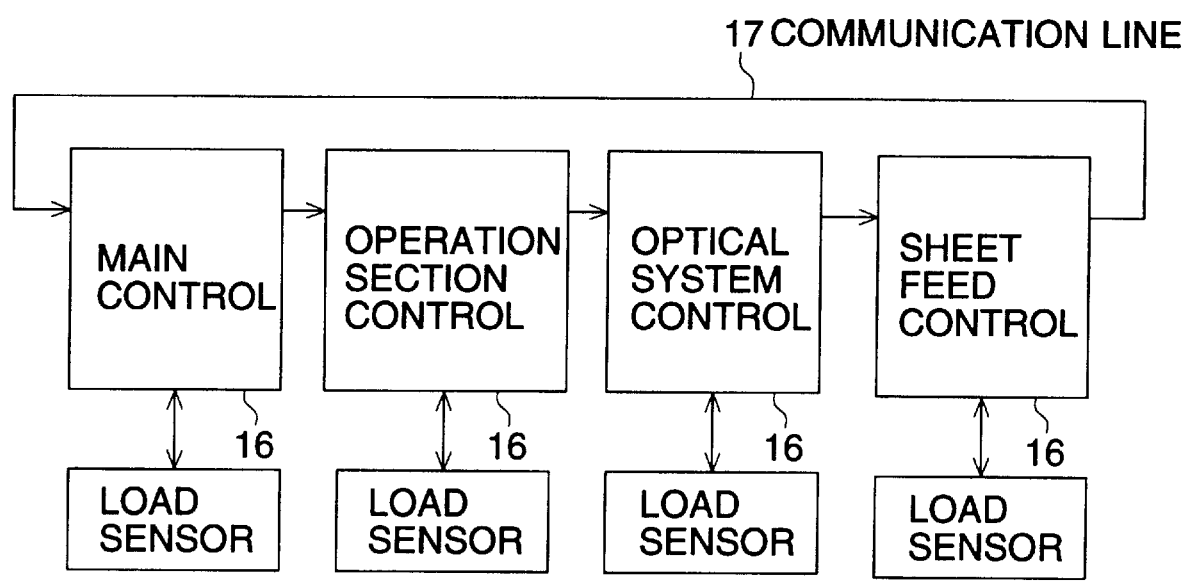
FIG. 24 is a view showing another example of a LAN system.

FIG. 15 and FIG. 16 are views showing an example of the structure of the connection between blocks (control means) of Example 2 of the embodiment. The identical blocks in FIG. 11 are denoted by the same numerals. Numeral 27 in each block is an open-collector transistor. Example 2 is structured such that the clock is outputted from the control block #1 to the communication line 25c for the X & CLOCK, and the clock signals are inputted to other blocks through the communication line 25c. In the example of the embodiment, the X & CLOCK is used for both the first communication line (the first line) and the second communication line (the second line), however, the X & CLOCK may, of course, be separately provided for the first communication line and the second communication line.

The open-collector transistor of each block is connected to the DATA-1 communication line 25a. DATA-OUT-1 and DATA-IN-1 of each block are also connected to the DATA-1 communication line 25a, and thus a two-way signal circuit is structured. Further, BUSY & LATCH-OUT-1, BUSY & LATCH-IN-1 of each block are also connected to the BUSY & LATCH-1 communication line 25b, and thus a two-way signal circuit is formed.

The open-collector transistor of each block is connected to the DATA-2 communication line 26a. DATA-OUT-2 and DATA-IN-2 of each block are also connected to the DATA-2 communication line 26a, and in such manner a two-way signal circuit is structured. Further, BUSY & LATCH-OUT-2 and BUSY & LATCH-IN-2 of each block are connected to also the BUSY & LATCH-2 communication line 26b, and thus a two-way signal circuit is formed.

The relationship of the connection of the PRIORITY communication line 25d is as follows. PRIORITY-OUT-1 from the upper block is inputted into the PRIORITY-IN-1 input of each block. The PRIORITY-IN-1 and PRIORITY-OUT-1 are inputted into an AND gate 28a, and the output of the AND gate 28a is outputted from an open collector transistor 29a as a PRIORITY-OR-OUT-1 signal. The output of the transistor 29a is connected to a PRIORITY-1 communication line 25d.

As shown by the structure of the circuit in the drawing, in the PRIORITY-1 communication line 25d, the upper rank of the adjoining priorities is for the output (PRIORITY-OUT-1) and the lower rank is for the input (PRIORITY-IN-1). The upper rank output (PRIORITY-OUT-1) is logically added to the input from the higher rank (PRIORITY-IN-1), and outputted (PRIORITY-OR-OUT-1). Thereby, this communication line 25d is structured such that the command can be easily passed down from the upper rank to the lower rank.

The above relationship is identical to the second PRIORITY-2 communication line 26c. That is, PRIORITY- OUT-2 from the upper block is inputted into the PRIORITY-IN-2 input of each block. The PRIORITY-IN-2 and PRIORITY-OUT-2 are inputted into an AND gate 28b, and the output of the AND gate 28b is outputted from an open collector transistor 29b as a PRIORITY-OR-OUT-2 signal. The output of the transistor 29b is connected to the PRIORITY-2 communication line 26c. As shown by the structure of the circuit in the drawing, in the PRIORITY-2 communication line 26c, the upper rank of the adjoining priorities is for the output (PRIORITY-OUT-2) and the lower rank is for the input (PRIORITY-IN-2). The upper rank output (PRIORITY-OUT-2) is logically added to the input from the higher rank (PRIORITY-IN-2), and outputted (PRIORITY-OR-OUT-2). Thereby, this communication line 25c is structured such that the command can be easily passed down from the upper rank to the lower rank.

Further, although not shown, PRIORITY-3, DATA-3 and BUSY & LATCH-3 may be added to a block in order to provide the third communication line (connection means), and when PRIORITY-n (n is integer), DATA-n, and BUSY & LATCH-n are added to the block, n-th communication line can be provided.

Figure 14:
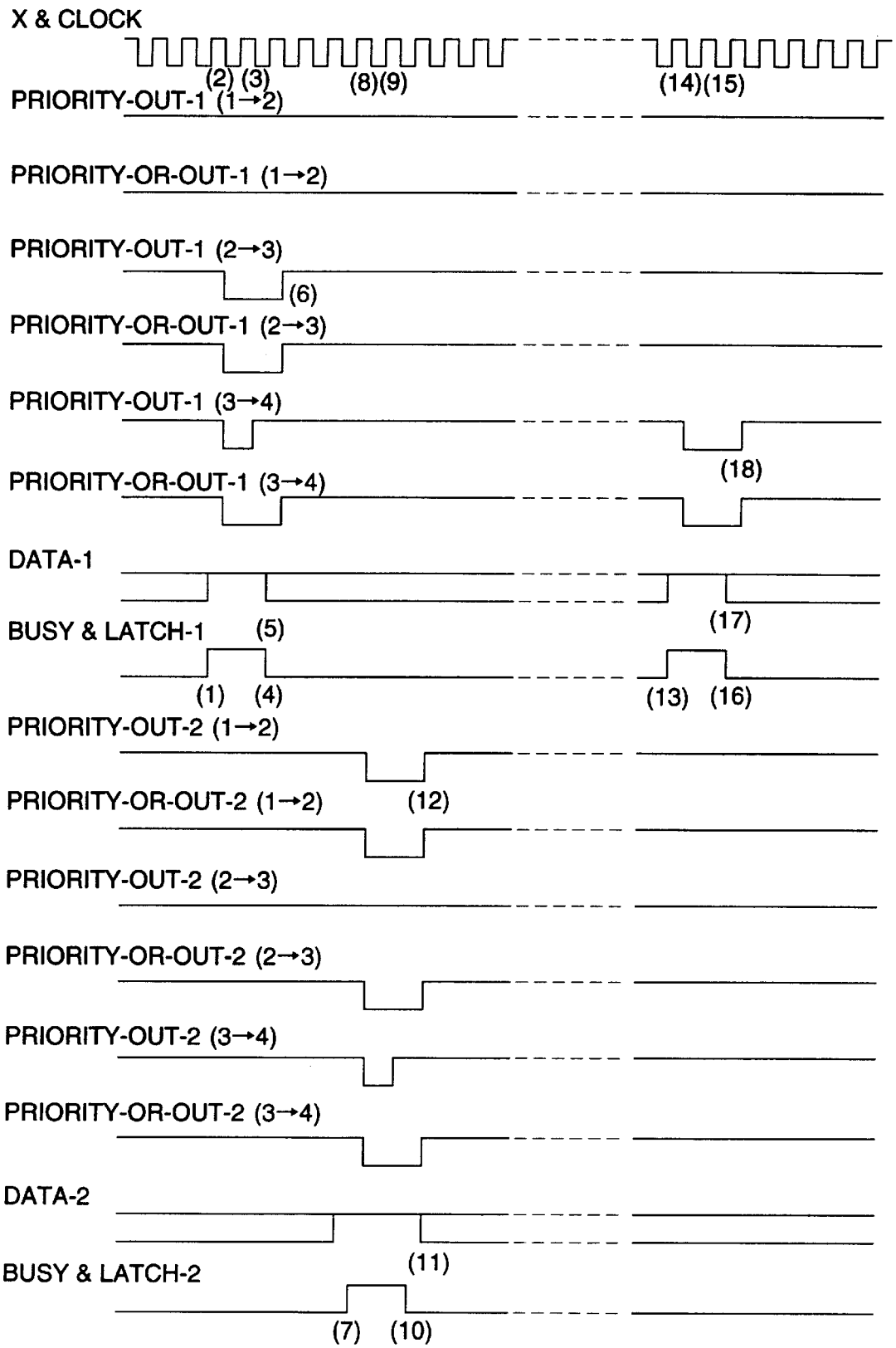
FIG. 14 is a view showing an example of the transmission right acquisition timing chart of Example 2.

FIG. 14 is a view showing an example of the transmission right acquisition timing chart of Example 2 of the embodiment, and shows a case in which the transmission requirement event is generated in the optical block #2 and the ADF block #3, while any block is using both the first communication line 25 and the second communication line 26 for communication, and after several periods of time, the transmission requirement event is generated in the control block #1. The priority of each block is as shown in FIG. 6. Initially, when the communication of any block has been completed in the first communication line 25 at timing (1), in synchronization with the leading edge of the X & CLOCK, the BUSY & LATCH-1 rises.

The block in which the transmission requirement event is generated at timing (2), synchronized with the next trailing edge of X & CLOCK, lowers the PRIORITY-1 output (PRIORITY-OUT-1). As described above, herein, because the transmission requirement event is generated in the optical block #2, and the ADF block #3, the PRIORITY-OUT-1 outputted from the control block #1 to the optical block #2 (1→2) remains high. However, PRIORITY-OUT-1 outputted from the optical block #2 to the ADF block #3 (2→3) and PRIORITY-OUT-1 outputted from the ADF block #3 to the drum block #4 (3→4), fall from a high level to a low level. PRIORITY-OUT-1 outputted from the drum block #4 to the sheet feed block #5, not shown in the drawing, (4→5) through PRIORITY-OUT-1 outputted from the AC block #8 to the STR block #9 (8→9), remain high.

Now, PRIORITY-OUT-1 outputted from the optical block #2 to the ADF block #3 (2→3) falls, and thereby, PRIORITY-OUT-1 outputted from the ADF block #3 to the drum block #4 (3→4), which is OR-outputted from the ADF block #3 to the drum block #4, through PRIORITY-OUT-1, which is OR-outputted from the AC block #8 to the STR block #9 (8→9), are collectively lowered. Further, at the timing (3) synchronized with the next trailing edge of X & CLOCK, because PRIORITY-IN-1 is on a low level, ADF block #3 judges that the transmission right acquisition requirement is generated in a block higher than ADF block #3, and raises PRIORITY-OUT-1 (3→4) and discards the transmission right acquisition requirement.

On the other hand, because PRIORITY-IN-1, (that is, PRIORITY-OR-1 (1→2), is on a high level, the optical block #2 judges that the transmission right acquisition requirement is not generated at a rank higher than the optical block #2, and the BUSY & LATCH-1 falls at timing (4), and the optical block #2 acquires the transmission right. The output of data of the DATA-1 is initiated to the DATA-1 communication line 25a at timing (5) synchronized with the leading edge of the same X & CLOCK. In this connection, DATA-1 is read in synchronization with the trailing edge of the X & CLOCK. Because the transmission right acquisition sequence has been completed, PRIORITY-OUT-1 (2→3) is raised at the timing (6). The transmission requirement event of the optical block #2 is cleared after the transmission right has been acquired.

Next, the transmission requirement event is also generated in the control block #1 after the several period of time. At this time, when the in-communication discrimination means 51A in the control means 30 recognizes that the first communication line 25 is in communication, the in-communication discrimination means 51A informs that information to the switching means 35. When the switching means 35 receives that information, it switches the connection from the first communication line 25 to the second communication line 26. After that, when the communication of some block has been completed in the second communication line 26 at timing (7), BUSY & LATCH-2 rises. Then, a block in which the transmission requirement event is generated at timing (8), synchronized with the next trailing edge of X & CLOCK, lowers the PRIORITY-2 output (PRIORITY-OUT-2) for the transmission right acquisition requirement.

Because the transmission requirement event is generated in the control block #1 and the ADF block #3, PRIORITY-OUT-2 (2→3), outputted from the optical block #2 to the ADF block #3, remains high. However, PRIORITY-OUT-2 (1→2), outputted from the control block #1 to the optical block #2, and PRIORITY-OUT-2 (3–4), outputted from the ADF block #3 to the drum block #4, are lowered from the high level to the low level.

PRIORITY-OUT-2 outputted from the drum block #4 to the sheet feed block #5, not shown in the drawing, (4→5) through PRIORITY-OUT-2 outputted from the AC block #8 to the STR block #9 (8→9), remain high. Further, because PRIORITY-OUT-2 outputted from the control block #1 to the optical block #2 (1→2) is lowered, PRIORITY-OR-OUT-2, which is OR-outputted from the optical block #2 to the ADF block #3 (2→3), through PRIORITY-OR-OUT-2, which is OR-outputted from the AC block #8 to the STR block #9 (8→9), are collectively lowered.

Further, at timing (9) synchronized with the next trailing edge of X & CLOCK, because PRIORITY-IN-2 is on the low level, ADF block #3 judges that the transmission right acquisition requirement is generated in a block higher than ADF block #3, raises PRIORITY-OUT-2 (3→4) and discards the transmission right acquisition requirement. On the other hand, because the control block #1 is the highest rank, BUSY & LATCH-2 is lowered at timing (10), and the control block #1 acquires the transmission right. Further, the control block #1 starts data transmission to the DATA-2 communication line 26a in synchronization with the leading edge of X & CLOCK at the same timing (11). In this connection, DATA-2 is also read in synchronization with the trailing edge of X & CLOCK. Because the transmission right acquisition sequence has been completed, PRIORITY-OUT-2 (1→2) is raised at timing (12). The transmission requirement event of the control block #1 is also cleared after the transmission right acquisition.

At this time, when the in-communication discrimination means 51B in the control means 30 recognizes that the first communication line 26 is in communication, the in-communication discrimination means 51B informs that information to the switching means 35. When the switching means 35 receives that information, it switches the connection from the second communication line 26 to the first communication line 25. After that, the communication of the optical block #2 has been completed at the timing (13), and BUSY & LATCH-2 rises. Then, a block, in which the transmission requirement event is generated at timing (14), synchronized with the next trailing edge of X & CLOCK, lowers the PRIORITY-1 output (PRIORITY-OUT-1) for the transmission right acquisition requirement.

As described above, the transmission requirement event is generated in the ADF block #3. PRIORITY-OUT-1 (1→2), outputted from the control block #1 to the optical block #2, and PRIORITY-OUT-1 (2→3), outputted from the optical block #2 to the ADF block #3, remain high. However, PRIORITY-OUT-1 (3→4), outputted from the ADF block #3 to the drum block #4, is lowered from a high level to a low level.

PRIORITY-OUT-1 outputted from the drum block #4 to the sheet feed block #5, not shown in the drawing, to the sheet feed block #5 (4→5) through PRIORITY-OUT-1, outputted from the AC block #8 to the STR block #9 (8→9), remain high. Further, because PRIORITY-IN-1, (that is, PRIORITY-OR-OUT-1 (2→3), is on the high level at timing (15), synchronized with the next trailing edge of X & CLOCK, the ADF block #3 judges that the transmission right acquisition requirement is not generated at a rank higher than the ADF block #3, and lowers BUSY & LATCH-1 at timing (16) and acquires the transmission right. Further, outputting of data from DATA-1 is started to the DATA-1 communication line 25a at same timing (17) in synchronization with the leading edge of X & CLOCK. Because the transmission right acquisition sequence has been completed, PRIORITY-OUT-1 (3→4) is raised. Then, the transmission requirement event of the ADF block #3 is cleared after the acquisition of the transmission right.

As described above, also in the case of Example 2 of the embodiment, simultaneous designation of the same priority is prohibited, and thereby, the control means 30 does not simultaneously require multiple transmission, so that data transmission can be carried out more quickly.

As described above, due to Example 2 of the embodiment, the control circuit 30 has the first and the second transmission right acquisition means 50A and 50; one of these transmission right acquisition means, provided in the control means 30, judges whether any of control means 30 is in serial transmission; when no control means 30 is in serial transmission, the transmission right acquisition means judges, according to the previously designated priority, whether another control means 30, having a higher priority than this control means 30 itself, declares the communication; when no control means 30 declares the communication, this control means 30 itself declares the communication, and starts the serial transmission; when any control means 30 is in serial transmission, the connection means is switched by the switching means 35, and another transmission right acquisition means judges whether this control means 30 itself can declare the communication; and when the control means 30 itself can declare the communication, the control means 30 itself starts the serial transmission. Accordingly, in a LAN system in which the communication line are commonly used by a plurality of control means 30, a control system, in which urgent communication can be carried out, and conditions of the response speed are further considered, can be provided for conditions of the response speed, such as, in the case of copiers, in the optical control in which comparatively high speed response is required, in the process control of the drum and its relating devices in which an intermediate response speed is allowable, and in the transfer sheet conveyance control system in which a lower speed response is allowable.

In this connection, in the above-described Example 1 of the embodiment and Example 2 of the embodiment, a priority can be designated for each connection means. Therefore, by enabling the priority designation for each connection means, when the highest priority designation is given for each connection means in cases where there are plural controls, requiring the comparatively high speed response, a control system can be realized, in which urgent communication can be carried out and conditions of the response speed of each control means are further considered.

Further, the above examples can have a switching judgment means to prohibit the switching of the switching means. Thereby, when the switching of the switching means is prohibited in the low response system, a control system can be realized, in which urgent communication can be carried out in the high speed response system and conditions of the response speed of each control means are further considered.

Further, when any control means is in serial transmission by the switched connection means, the connection means can be switched to another switching means. Therefore, by switching the connection means to another connection means when any control means is in serial transmission by the switched connection means, any empty connection means is automatically searched for. Thereby, a control system can be realized, in which urgent communication can be carried out and conditions of the response speed of each control means are further considered.

Still further, when any control means is in serial transmission by the switched connection means, the connection means can be returned to the first connection means. Therefore, by returning the connection means to the first connection means when any control means is in serial transmission by the switched second connection means, waiting at the second connection means is prohibited, and the second connection means is ranked for urgent communication. Thereby, a control system can be realized, in which conditions of the response speed of each control means are further considered.

Furthermore, when the serial transmission has been completed by the switched connection means, the connection means can be returned to the first connection means. Therefore, by returning the connection means to the first connection means when the serial transmission has been completed by the switched connection means, normally, the first connection means is absolutely used, and a connection means other than the first connection means is allocated for the urgent communication. Thereby, a control system can be realized, in which conditions of the response speed of each control means are further considered.

Yet further, it can be possible that at least more than 2 control means, connected by the first connection means, are not the same as the control means, connected by the second control means. Therefore, when at least 2 or more control means, connected by the first connection means, are not the same as the control means, connected by another control means, the control means other than the first connection means are allocated for only the control means which requires the comparatively high speed response, or also for the control means in which an intermediate response speed is allowable. Thereby, a control system can be realized, in which urgent communication can be carried out and conditions of the response speed of each control means are further considered.

In the above examples of the embodiment, 9 control means, labeled of #1~#9 are shown as an example of the control means 30 (block). However, the present invention is not limited to this example, but can be applied for a system using an arbitrary number of control means. Further, the control system is also not limited to a copier, but can be applied to other systems in the same way.

Further, in the examples of the embodiment, a case, in which the operation means 20 and the control means 30 are connected to each other in the manner of 1 to 1, is shown. However, the present invention is not limited to such cases, but one control means 30 may control a plurality of operation means 30.

Figure 25:
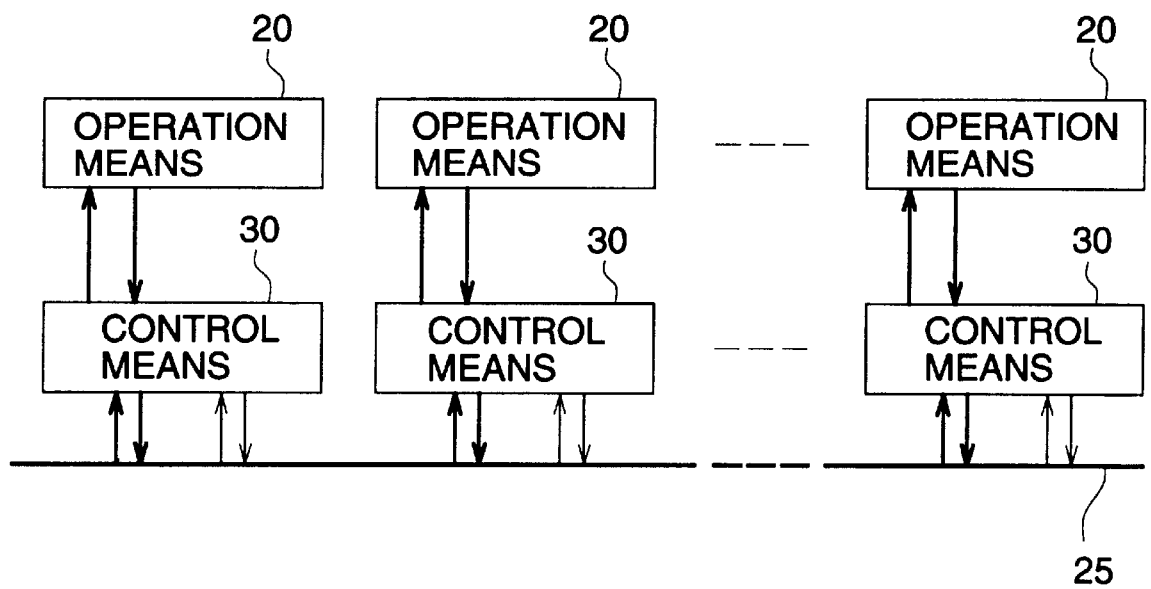
FIG. 25 is a block diagram in which a single communication line is used.
Figure 26:
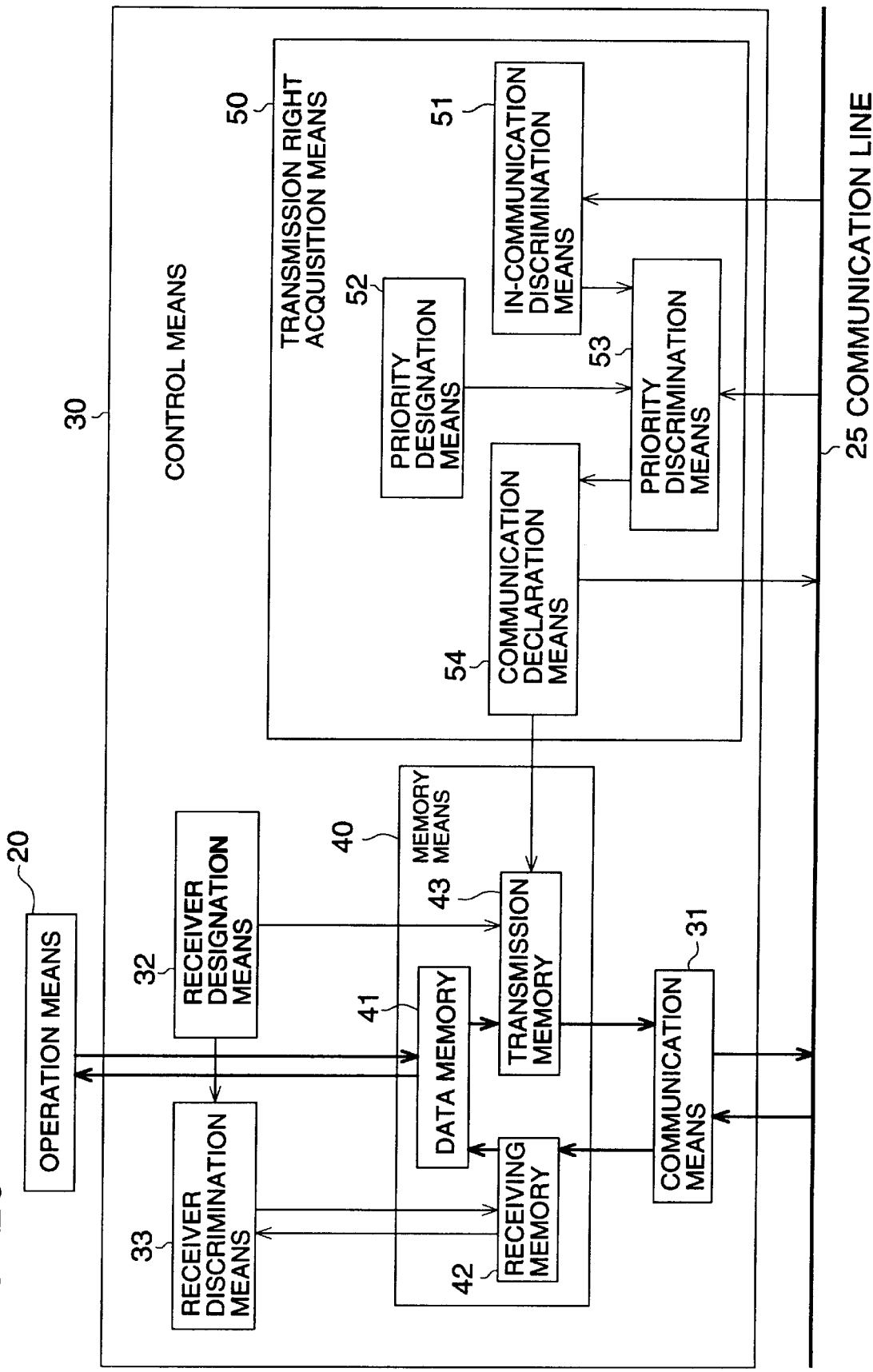
FIG. 26 is a block diagram of a main portion in the case of the single communication line.
Figure 27:
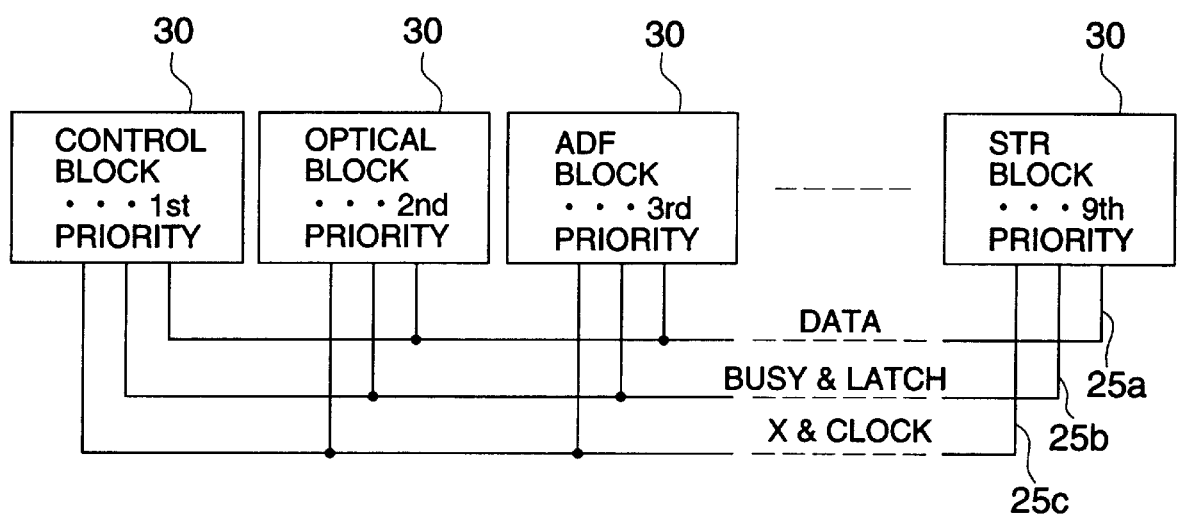
FIG. 27 is a view showing a structure of the connection in the case of the single communication line, and FIG. 27 corresponds to Example 1 shown in FIG. 3.
Figure 28:
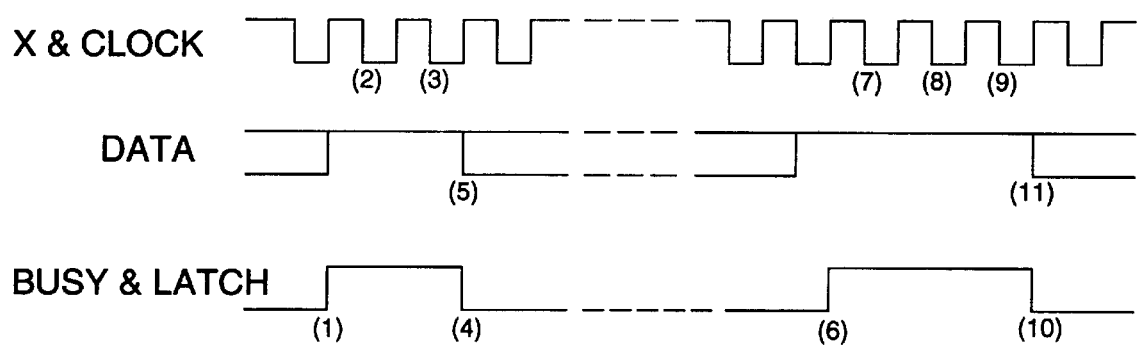
FIG. 28 is a view showing an example of a transmission right acquisition timing chart in the case of the single communication line, and FIG. 28 corresponds to FIG. 5.
Figure 29:
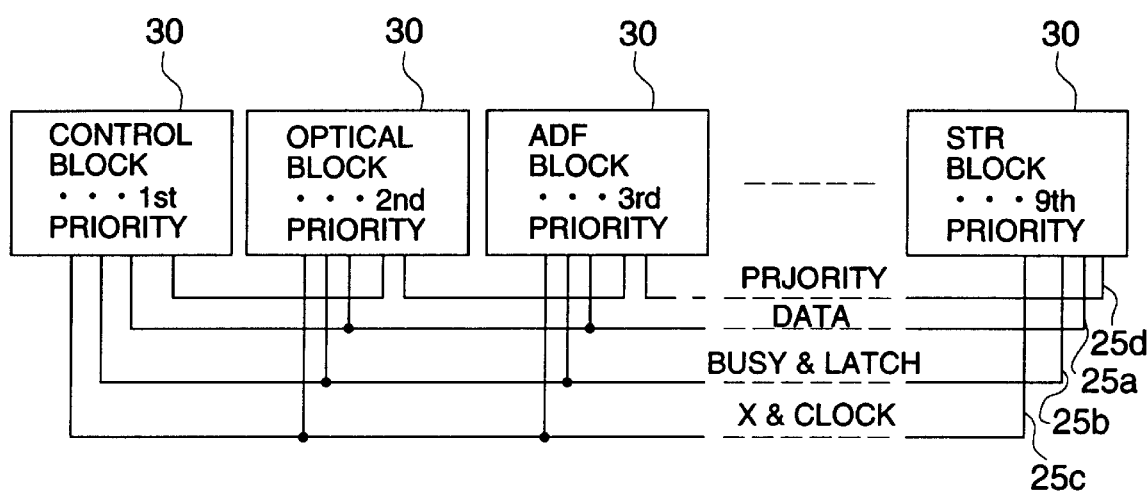
FIG. 29 is a view showing a structure of the connection in the case of the single communication line, and FIG. 27 corresponds to Example 2 shown in FIG. 12.

Incidentally, in the above examples, plural communication lines 25, 26 and the switching means 35 are used. However, the present invention can be applied to a single communication line. FIG. 25 is a block diagram in which a single communication line is used. FIG. 26 is a block diagram of a main portion in the case of the single communication line. FIG. 27 is a view showing a structure of the connection in the case of the single communication line, and FIG. 27 corresponds to Example 1 shown in FIG. 3. FIG. 28 is a view showing an example of a transmission right acquisition timing chart in the case of the single communication line, and FIG. 28 corresponds to FIG. 5. FIG. 29 is a view showing a structure of the connection in the case of the single communication line, and FIG. 29 corresponds to Example 2 shown in FIG. 12.

As shown in FIG. 25, the switching means 35 is not provided in the case of the single communication line. As shown in FIG. 28, when the single communication line is occupied by one of the control means 30, the rest of the control means 30 are in a waiting condition. Thereafter, when BUSY&LATCH signal becomes high level informing the condition that the single communication line is not occupied, the transmission right is assigned in accordance with the priority rank of the control means 30. That is, when one of the control means 30 obtains the transmission right when another control means 30 having a higher priority rank do not request the transmission right.

As detailed above, due to the present invention, when at least 2 control means to respectively control any of a plurality of operation means, in which the condition of response speeds are different from each other, acquire the right to transmit command data to operate any of several operation means, or to transmit status data of the operation means, according to priority based on the condition of the response speed of each operation means, the control means acquires the right to transmit command data to operate any of the operation means, or to transmit status data of the operation means, according to the priority based on the condition of the response speed of each operation means, and thereby, in the LAN system in which a communication line is commonly used by a plurality of control means, the present invention can realize a control method, in which conditions of response speeds are considered, as in the case of copiers, such as, in an optical system control in which comparatively high speed response is required, a process control of a drum and its related devices in which an intermediate speed response is allowable, and a transfer sheet conveyance system control in which a lower speed response is allowable.

The invention comprising: a plurality of operation means to carry out specific processing, in which conditions of the response speed are different from each other; at least 2 control means to respectively control any of the operation means; and connection means to connect the control means to each other, wherein the control means, in which the priority is respectively designated according to the condition of the response speed of the operation means, have a memory means to store the command data for any of the operation means, and the status data of the operation means therein; an in-communication discrimination means to discriminate whether another control means is in serial communication, or not; a priority discrimination means to discriminate whether another control means having higher priority is requiring the serial communication, or not, when it is discriminated by the in-communication discrimination means that no control means is in serial communication; and a communication means to transfer in serial the command data or the status data stored in the memory, when it is discriminated by the priority discrimination means that no other control means having higher priority is requiring the serial communication, and when the control means itself is requiring the serial communication, and thereby, the communication means, provided in the control means, judges whether any control means is serially transferring data, and judges whether another control means, having higher priority than this control means itself, is declaring the communication, according to a previously specified priority, when no control means is serially transferring data; and when no control means is declaring the communication, this control means itself declares the communication and starts the serial transferring. Accordingly, in the LAN system in which a communication line is commonly used by a plurality of control means, the present invention can provide a control system, in which conditions of response speeds are considered, as in a case of a copier, such as, in an optical system control in which comparatively high speed response is required, a process control of a drum and its relating devices in which an intermediate speed response is allowable, and a transfer sheet conveyance system control in which a lower speed response is allowable.

In this case, the same priority designation by plural control means is prohibited, and therefore, request for transmission does not occur at the same time. Thereby, data can be quickly transmitted.

Each control means comprises: a receiver designation means to add receiver designation information to command data or status data, stored in the memory means; and a receiver discrimination means to discriminate, by the receiver designation means, whether received data is for the control means itself, when command data or status data is received from other control means. Accordingly, data can be securely transmitted to the specific data receiver by designating the data receiver by the receiver designation means. Further, by use of the receiver discriminating means, transmitted data can be securely received by discriminating whether transmitted data is for the control means itself.

As detailed above, according to the first invention, the following effects can be attained.

A control method in which at least 2 control means to respectively control any of a plurality of operation means, in which a condition of response speed is different from each other, acquire the right to transmit command data to operate any of the operation means, or to transmit status data of the operation means, according to the priority based on the condition of the response speed of each operation means, the control method is characterized in that at least 2 control means acquire the transmission right to use the second connection means according to the priority, when these control means can not acquire the transmission right to use the first connection means. Thereby, when the transmission right to use the first connection means can not be acquired, the transmission right to use the second connection means can be acquired, and thereby, the present invention can provide a control method by which urgent communication can be performed, and in which the condition of the response speed is further considered.

Due to the second invention, the invention comprises the first and the second connection means; any transmission right acquisition means, provided in the control means, judges whether any control means is serially transferring data, and further judges whether another control means, having higher priority than this control means itself, is declaring the communication, according to a previously specified priority, when no control means is serially transferring data; when no control means is declaring the communication, this control means itself declares the communication and starts the serial transfer; when some control means is in serial transfer, the connection means is switched by the switching means, and another transmission right acquisition means discriminates whether the communication can be declared or not; and when the communication declaration is possible, the serial communication is started. Accordingly, in a LAN method in which a communication line is commonly used by a plurality of control means, the present invention can provide a control system, in which urgent communication can be performed for conditions of response speeds, as in a case of a copier, in which an optical system control requires comparatively high speed response, a process control of a drum and its relating devices in which an intermediate speed response is allowable, and a transfer sheet conveyance system control in which a lower speed response is allowable; and in which the conditions of response speed are further considered.

In this case, when the same priority designation of each control means is prohibited, data collision of each control means can be prevented. Further, by enabling the priority designation for each connection means, when there are plural controls requiring comparatively high speed response, the urgent communication can be performed by allocating the highest priority to each connection means, and thereby, a control system can be realized, in which the condition of the response speed of each control means is further considered.

Further, when a switching judgment means to prohibit the switching of the switching means is provided in the system, and thereby the switching of the switching means is prohibited in the low speed response system, a control system can be realized, by which urgent communication in the high speed response system can be carried out, and in which the condition of the response speed of each control means is further considered.

Further, when the connection means is switched to another connection means while some control means is in the serial transfer using the previously switched connection means, a control system can be realized, in which an empty connection means is automatically searched for, and thereby, the urgent communication can be conducted, and the condition of the response speed of each control means is further considered.

Further, when the connection means is returned to the first connection means while some control means is still in the serial transfer using the second switched connection means, waiting at the second connection means is prohibited, and the second connection means is positioned for the urgent communication, and thereby, a control system can be realized in which the condition of the response speed of each control means is further considered.

When the connection means is returned to the first connection means in cases where the serial transfer has been completed by the previously switched connection means, the connection means, excepting the first connection means, is ranked for the urgent communication by normally using the first connection means absolutely, and thereby, a control system can be realized, in which the condition of the response speed of each control means is further considered.

When the connection means is returned to the first connection means in the case where the serial transfer has been completed by the previously switched connection means, the connection means excepting the first connection means is ranked for urgent communication by normally using the first connection means absolutely, and thereby, a control system can be realized, in which the condition of the response speed of each control means is further considered.

When at least 2 or more control means connected by the first connection means are not the same as the control means connected by the other connection means, the connection means, excepting the first connection means, are allocated for only a control means, requiring comparatively high speed response, or allocated also for a control means in which an intermediate speed response is allowable, and thereby, urgent communication can be carried out, and therefore, a control system can be realized, in which the condition of the response speed of each control means is further considered.

What is claimed is:

1. A system for controlling data transmission, comprising:
   at least two control means;
   a first common communication line to which each of the at least two control means is connected; and
   a plurality of operation means for carrying out respective processing operations;
   wherein each of the at least two control means is connected with a different one of the plurality of operation means and is provided with a priority rank depending on the one of the operation means connected thereto; and
   wherein each of the at least two control means comprises: (i) a memory for storing at least one of command data and status data corresponding to the one of the operation means connected thereto, (ii) priority rank discriminating means for discriminating whether a right to transmit data is requested by another one of the control means having a higher priority rank, and (iii) transmitting means for transmitting the data stored in the memory to the first common communication line only if the priority rank discriminating means discriminates that the right to transmit data has not been requested by another one of the control means having the higher priority rank.

2. The system of claim 1, wherein each of the control means further comprises line condition discriminating means for discriminating whether the first common communication line is in use by any other one of the control means.

3. The system of claim 1, wherein the transmitting means of each of the control means comprises means for serially transmitting the data stored in the respective memories thereof.

4. The system of claim 1, wherein each of the control means is provided with respective different priority ranks.

5. The system of claim 1, wherein each of the control means further comprises receiver designation means for adding receiver information designating one of the control means to receive the data.

6. The system of claim 1, wherein each of the control means further comprises receiver discriminating means for discriminating data transmitted thereto from any other control means.

7. The system of claim 1, further comprising a main control means for controlling said at least two control means, and wherein the main control means is connected to the first common communication line.

8. The system of claim 1, further comprising a second common communication line, and wherein each of the control means further comprises switching means for switching from one of the first and second common communication lines to the other of the first and second communication lines.

9. The system of claim 8, wherein, when the first communication line is in use, the priority rank discriminating means of each of the control means discriminates whether a right to transmit data through the second communication line is requested by any other one of the control means having a higher priority rank higher.

10. The system of claim 9, wherein, when the second common communication line is in use, the switching means of a given one of the control means returns from the second common communication line to the first common communication line.

11. The system of claim 10, wherein the switching means of the given one of the control means also returns from the second common communication line to the first common communication line after the data in the memory of the given one of the control means has been transmitted through the second common communication line.

12. The system of claim 9, further comprising switch-judging means for inhibiting switching between the first and second common communication lines.

13. The system of claim 9, wherein at least one of the control means is connected to the first common communication line and at least one other different one of the control means is connected to the second common communication line.

14. A method of controlling data transmission through a first common communication line from at least two control means which are respectively connected to different operation means for carrying out respective processing operations and which are respectively provided a priority rank depending on the one of the operation means connected thereto, said method comprising:

discriminating whether a right to transmit data is requested by another one of the control means having a higher priority rank; and providing one of the control means with a right to transmit data through the first common communication line when there is no request to transmit data from another one of the control means having a higher priority rank.

15. The method of claim 14, wherein a second common communication line is provided, and wherein when a right to transmit data is requested by any other one of the control means while the first common communication line is in use, the other control means is provided with a right to transmit the data through the second common communication line in accordance with the priority rank of the other control means.

16. An image forming apparatus providing a system for controlling data transmission, comprising:

at least first, second and third control means;

a first common communication line to which each of the first, second and third control means is connected; and a plurality of operation means for carrying out respective processing operations;

wherein each of the first, second and third control means is connected with a respective one of the operation means and is provided with a priority rank depending on the one of the operation means connected thereto; and wherein each of the first, second and third control means comprises: (i) a memory for storing at least one of command data and status data corresponding to the one of the operation means connected thereto, (ii) priority rank discriminating means for discriminating whether a right to transmit data is requested by another one of the first, second and third control means having a higher priority rank higher, and (iii) transmitting means for transmitting the data stored in the memory to the first common communication line only if the priority rank discriminating means discriminates that the right to transmit data has not been requested by another one of the first, second and third control means having the higher priority rank.

17. The apparatus of claim 16, further comprising a second common communication line, and wherein each of the first, second and third control means further comprises means for switching from one of the first and second common communication lines to the other of the first and second common communication lines.

18. The apparatus of claim 17, wherein, when the first communication line is in use, (i) the priority rank discriminating means of a given one of the first, second and third control means discriminates whether a right to transmit data through the second communication line is requested by any other one of the first, second and third control means having a higher priority rank, and (ii) the transmitting means of the given one of the first, second and third control means transmits the data stored in the memory of the given one of the first, second and third control means to the second common communication line only if the priority rank discriminating means of the given one of the first, second and third control means discriminates that the right to transmit data through the second communication line has not been requested by any other one of the first, second and third control means having the higher priority rank.

* * * * *